(12) United States Patent
Takaoka et al.

(10) Patent No.: US 8,088,464 B2
(45) Date of Patent: Jan. 3, 2012

(54) INFORMATION RECORDING MEDIUM AND METHOD FOR MANUFACTURING SAME

(75) Inventors: Tomoyasu Takaoka, Osaka (JP); Yoshitaka Sakaue, Osaka (JP); Rie Kojima, Osaka (JP)

(73) Assignee: Panasonic Corporation, Osaka (JP)

( * ) Notice: Subject to any disclaimer, the term of this patent is extended or adjusted under 35 U.S.C. 154(b) by 661 days.

(21) Appl. No.: 12/295,083

(22) PCT Filed: Mar. 20, 2007

(86) PCT No.: PCT/JP2007/055597
§ 371 (c)(1),
(2), (4) Date: Sep. 29, 2008

(87) PCT Pub. No.: WO2007/119439
PCT Pub. Date: Oct. 25, 2007

(65) Prior Publication Data
US 2009/0086608 A1    Apr. 2, 2009

(30) Foreign Application Priority Data

Mar. 31, 2006   (JP) .................................. 2006-098816

(51) Int. Cl.
*B32B 3/02* (2006.01)
(52) U.S. Cl. ...................... 428/64.1; 428/64.4; 428/64.5; 428/64.6; 430/270.13
(58) Field of Classification Search .................. None
See application file for complete search history.

(56) References Cited

U.S. PATENT DOCUMENTS

| | | | |
|---|---|---|---|
| 7,858,290 B2 * | 12/2010 | Nishihara et al. | ........ 430/270.13 |
| 2004/0105182 A1 | 6/2004 | Nishihara et al. | |
| 2006/0083150 A1 * | 4/2006 | Sakaue et al. | ................. 369/125 |

FOREIGN PATENT DOCUMENTS

| | | |
|---|---|---|
| JP | 11-316981 A | 11/1999 |
| JP | 2003-013201 A | 1/2003 |
| JP | 2006-045666 A | 2/2006 |
| WO | WO 03/025922 A1 | 3/2003 |
| WO | WO2004/055800 | 7/2004 |

\* cited by examiner

*Primary Examiner* — Elizabeth Mulvaney
(74) *Attorney, Agent, or Firm* — Hamre, Schumann, Mueller & Larson, P.C.

(57) ABSTRACT

An information recording medium of the present invention includes N information layers on a substrate (1), where N is an integer of 2 or more. Information is recorded/reproduced by irradiating each of the information layers (11, 12) with a laser beam (4). When the N information layers are referred to as a first information layer to an N-th information layer sequentially from the opposite side to a laser beam incident side, the L-th information layer included in the N information layers includes at least a recording layer (135) capable of undergoing a phase change through laser beam irradiation, a reflective layer (132), and a transmittance adjusting layer (131) in this order from the laser beam incident side, where L is an integer satisfying $2 \leq L \leq N$. The transmittance adjusting layer (131) contains Nb, oxygen (O), and at least one element M selected from Ti, Zr, Hf, Y, Cr, Zn, Ga, Co, Bi, In, Ta, and Ce. In the transmittance adjusting layer (131), the content of Nb is at least 2.9 atom %.

44 Claims, 15 Drawing Sheets

INFORMATION RECORDING MEDIUM AND METHOD FOR MANUFACTURING SAME

TECHNICAL FIELD

The present invention relates to information recording media for recording and reproducing information through laser beam irradiation, and methods of manufacturing the same.

BACKGROUND ART

When a thin film formed of, for example, a chalcogen material deposited on a substrate is irradiated with a laser beam and thereby is heated locally, the difference in irradiation conditions makes it possible to cause a phase change between states with different optical constants. Information recording media that utilize this phenomenon are researched/developed and commercialized widely.

Among the information recording media that utilize the phase change, an optical recording medium allows signals to be recorded through modulation of output power of a laser beam between at least two power levels. Suitable selection of the power level makes it possible to record a new signal simultaneously while erasing a signal that has been recorded.

The inventors disclosed an optical recording medium with two information layers as a technique for increasing the capacity of an optical recording medium. Information can be recorded/reproduced with respect to the two information layers with a laser beam that is incident on the optical recording medium from one side thereof. Such a structure makes it possible to approximately double the storage capacity of the optical recording medium.

In the information recording medium for recording and reproducing information with respect to two information layers with a laser beam that is incident from one side, recording and reproducing information with respect to an information layer (hereinafter, a "first information layer") disposed far from the laser beam incident side (hereinafter also may be referred to simply as an "incident side") are carried out with a laser beam that has passed through the information layer located on the incident side (hereinafter, a "second information layer"). Accordingly, it is preferable that the second information layer have as high a transmittance as possible.

The inventors have been studying that in an information layer including a recording layer and a reflective layer in this order from the laser beam incident side, a transmittance adjusting layer having a high refractive index is disposed on the opposite side to the laser beam incident side with respect to the reflective layer, as a means for increasing the transmittance.

In a two-layer rewritable optical recording medium that utilizes a blue laser, which was disclosed recently, the transmittance of the second information layer was increased by 46% through the use of $TiO_2$ in the transmittance adjusting layer, which allowed efficient recording/reproducing with respect to the first information layer (see WO 03/025922).

$TiO_2$ is an excellent material for a transmittance adjusting layer since it has properties such as a high refractive index, specifically, approximately 2.7, a lower absorption with respect to a blue laser, and good moisture resistance even when it is attached directly to a reflective layer containing Ag.

It has been reported that with respect to a protective layer that directly covers a recording layer, the addition of a slight amount of $Nb_2O_5$ (for instance, in the range of 2.5 wt % to 11 wt % ($\approx$4 mol % or less, or Nb is 2.5 atom % or less)) to $TiO_2$ contained as a main component increases the refractive index (see, for example, JP 2003-013201 A and JP 2006-45666 A).

However, $TiO_2$ caused problems in that it takes a longer time to manufacture an information recording medium since it has a low deposition rate during sputtering and a great variation in deposition rate due to moisture, and it is difficult to maintain a constant thickness of the $TiO_2$ film.

DISCLOSURE OF INVENTION

The present invention solves the aforementioned problems and is intended to provide an information recording medium including an excellent transmittance adjusting layer that has both a stable and high deposition rate and a high refractive index that is comparable to a conventional one. Furthermore, the present invention also is intended to provide a method of manufacturing the information recording medium.

An information recording medium of the present invention includes N information layers (N is an integer of 2 or more) provided on a substrate, with each of the information layers being irradiated with a laser beam and information thereby being recorded/reproduced with respect to each of the information layers, wherein with the N information layers being referred to as a first information layer to an N-th information layer sequentially from an opposite side to a laser beam incident side, an L-th information layer (L is an integer satisfying $2 \leq L \leq N$) included in the N information layers includes at least a recording layer capable of undergoing a phase change through laser beam irradiation, a reflective layer, and a transmittance adjusting layer in this order from the laser beam incident side, and the transmittance adjusting layer contains Nb, oxygen (O), and at least one element M selected from Ti, Zr, Hf, Y, Cr, Zn, Ga, Co, Bi, In, Ta, and Ce, and the content of Nb in the transmittance adjusting layer is at least 2.9 atom %. In this specification, the element "M" denotes at least one element selected from Ti, Zr, Hf, Y, Cr, Zn, Ga, Co, Bi, In, Ta, and Ce, unless otherwise specified.

A method of manufacturing an information recording medium of the present invention is a method of manufacturing the aforementioned information recording medium of the present invention. The method includes a step for manufacturing the L-th information layer, and this step includes:
(i) a transmittance adjusting layer deposition step in which a transmittance adjusting layer is deposited using a first sputtering target that contains Nb, oxygen (O), and at least one element M selected from Ti, Zr, Hf, Y, Cr, Zn, Ga, Co, Bi, In, Ta, and Ce and that has a Nb content of at least 2.9 atom %,
(ii) a reflective layer deposition step in which a reflective layer is deposited, and
(iii) a recording layer deposition step in which a recording layer capable of undergoing a phase change through laser beam irradiation is deposited, and the steps (i) to (iii) are carried out in the order of steps (i), (ii), and (iii) or steps (iii), (ii), and (i).

According to the information recording medium of the present invention and the method of manufacturing the same, since a transmittance adjusting layer having a high refractive index that is comparable to a conventional one can be deposited stably and efficiently, the L-th information layer (L is an integer satisfying $2 \leq L \leq N$) has high transmittance, and a multilayer information recording medium with good recording/reproducing characteristics can be obtained efficiently.

DESCRIPTION OF THE PREFERRED EMBODIMENTS

Hereinafter, embodiments of the present invention are described with reference to the drawings. The following embodiments are examples and the present invention is not limited to the following embodiments. Furthermore, in the following embodiments, the same parts would be indicated with identical numerals and the same descriptions thereof may not be repeated.

Embodiment 1

Figure 1:
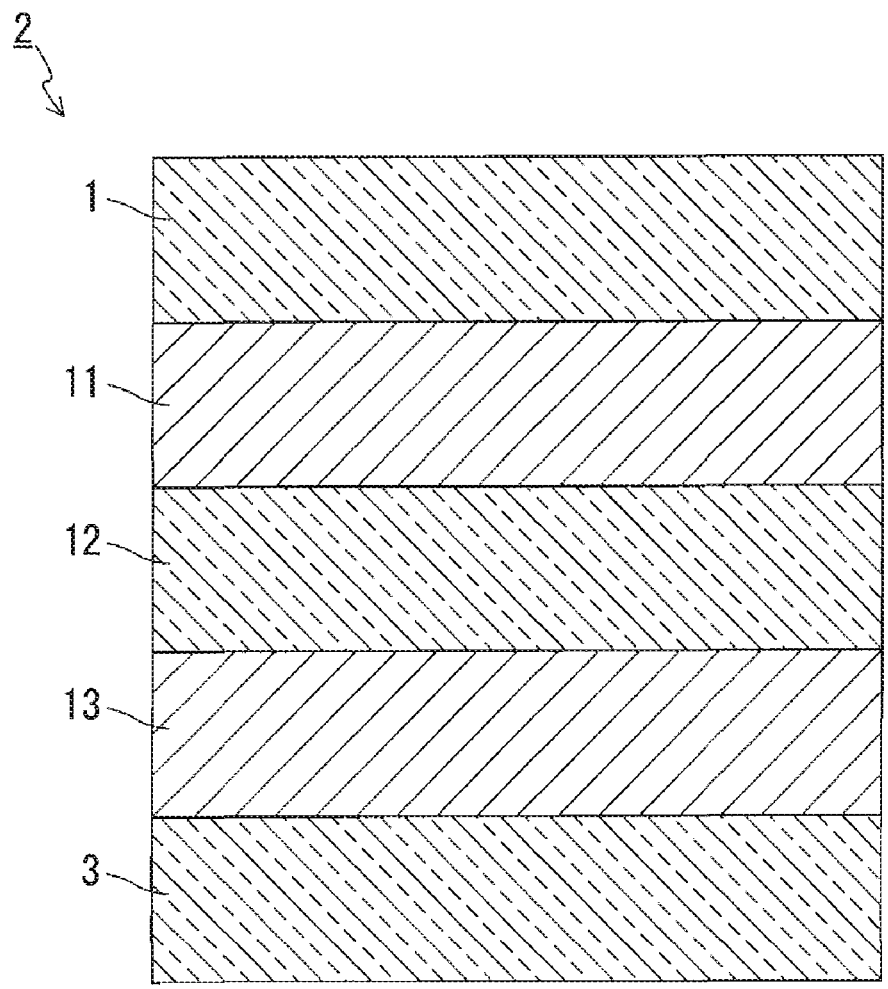
FIG. 1 is a sectional view showing a structural example of an information recording medium of the present invention.
Figure 1:
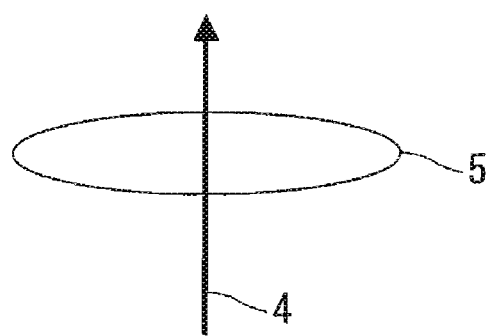

In Embodiment 1, an example of an information recording medium of the present invention is described. FIG. 1 shows a partial sectional view of an information recording medium of Embodiment 1. The information recording medium 2 of this embodiment is an optical information recording medium that can record and reproduce information through irradiation with a laser beam 4 focused through an objective lens 5.

The information recording medium 2 includes a first information layer 11, a separation layer 12, a second information layer 13, and a transparent layer 3 on a substrate 1 in this order. That is, the information recording medium 2 of this embodiment is an example obtained when N=2 and L=2 in the information recording medium of the present invention, and the second information layer 13 corresponds to the N-th information layer and the L-th information layer. Furthermore, in the information recording medium 2 of this embodiment, the transparent layer 3 side is the laser beam incident side.

Figure 2:
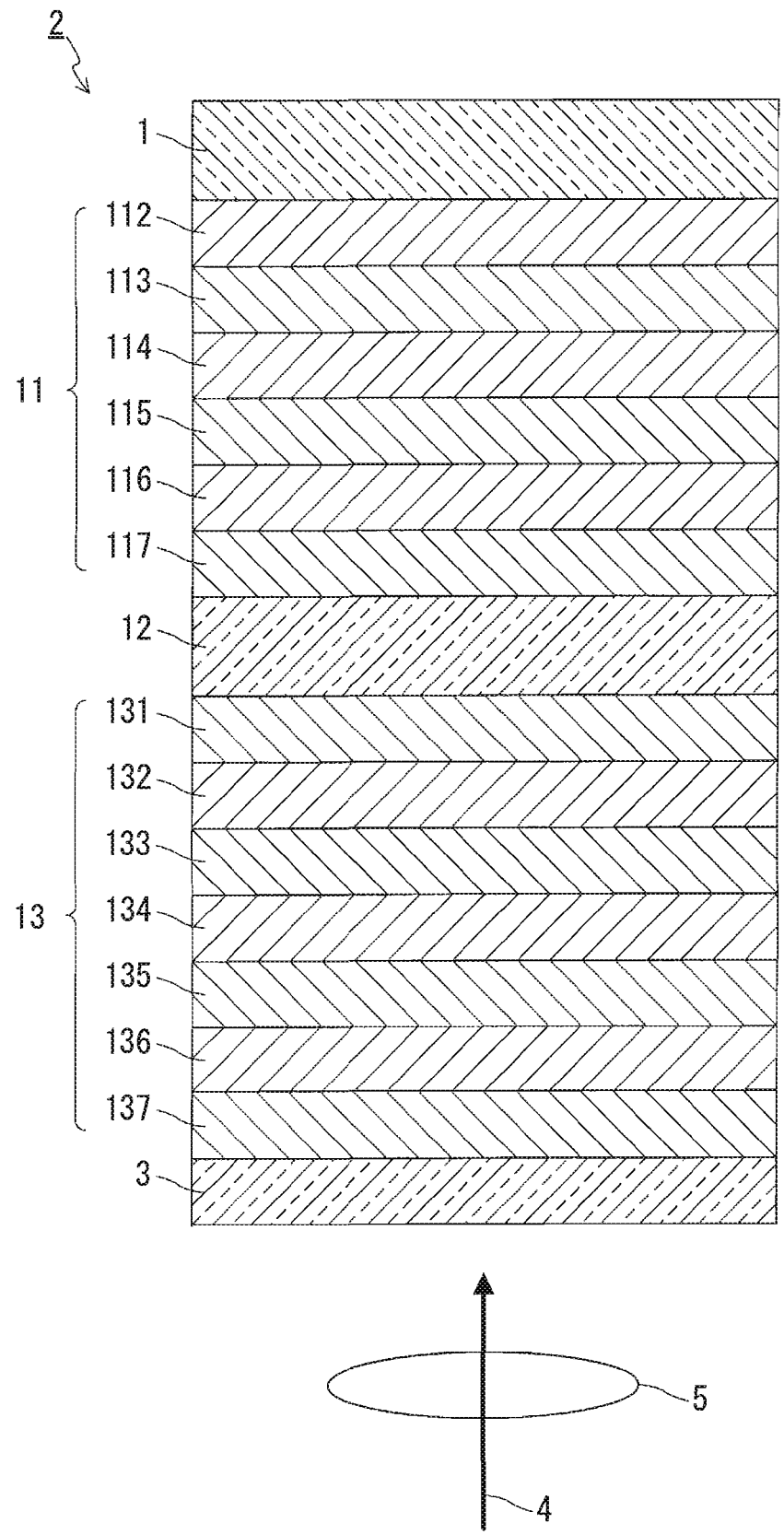
FIG. 2 is a sectional view showing another structural example of an information recording medium of the present invention.

FIG. 2 is a partial sectional view showing in detail the film structure of the first information layer 11 and the second information layer 13 with respect to the information recording medium 2 of this embodiment. As shown in FIG. 2, the first information layer 11 includes a reflective layer 112, a first dielectric layer 113, a first interface layer 114, a recording layer 115, a second interface layer 116, and a second dielectric layer 117 in this order from the side near to the substrate 1 (the opposite side to the laser beam incident side). The second information layer 13, disposed with a separation layer 12 interposed between the first information layer 11 and the second information layer 13, includes a transmittance adjusting layer 131, a reflective layer 132, a first dielectric layer 133, a first interface layer 134, a recording layer 135, a second interface layer 136, and a second dielectric layer 137 in this order. That is, the second information layer 13 includes the recording layer 135, the reflective layer 132, and the transmittance adjusting layer 131 in this order from the laser beam incident side.

With respect to this information recording medium 2, the laser beam 4 is focused through the objective lens 5 from the transparent layer 3 side, and the recording layer 115 of the first information layer 11 or the recording layer 135 of the second information layer 13 is irradiated with the laser beam, and thereby information is recorded/reproduced. In this case, the laser beam that reaches the first information layer 11 and reflected light thereof pass through the second information layer 13 to be attenuated. Accordingly, the first information layer 11 needs to have high recording sensitivity and high reflectance, while the second information layer 13 needs to have high transmittance.

In this embodiment, the substrate 1 has a disk-like shape and is provided to maintain all the layers including the first information layer 11. A guide groove for guiding the laser beam 4 may be formed at the surface on the first information layer 11 side of the substrate 1. Preferably, the substrate 1 has smooth surfaces located on the first information layer 11 side and on the opposite side thereto. Examples of the material that can be used for the substrate 1 include polycarbonate resin, polymethyl methacrylate resin, polyolefin resin, norbornene resin, glass, or suitable combinations thereof.

Next, the respective layers of the first information layer 11 are described.

The recording layer 115 is a layer capable of undergoing a phase change between a crystalline phase and an amorphous phase through irradiation with the laser beam 4. The material that is used for such a recording layer 115 can be one containing at least one material selected from Ge—Sb—Te, Ge—Bi—Te, Ge—Sn—Te, Ge—Sb—Sn—Te, and Ge—Bi—Sn—Te. It is preferable that the recording layer 115 can change easily from the amorphous phase to the crystalline phase when being irradiated with the laser beam, while it does not change into the crystalline phase when not being irradiated with the laser beam. With respect to the film thickness of the recording layer 115, sufficient reflectance and change in reflectance cannot be obtained when it is extremely thin, while the heat capacity increases and thereby the recording sensitivity decreases when it is extremely thick. Accordingly, the film thickness of the recording layer 115 is preferably in the range of 5 nm to 15 nm.

The reflective layer 112 has an optical function for increasing the amount of light to be absorbed by the recording layer 115 and a thermal function for diffusing heat generated in the recording layer 115. The material that is used for the reflective layer 112 can be one containing at least one element selected from Ag, Au, Cu, and Al. For instance, alloys such as Ag—Cu, Ag—Ga—Cu, Ag—Pd—Cu, Ag—Nd—Au, AlNi, AlCr, Au—Cr, and Ag—In can be used. Particularly, an Ag alloy is preferable as the material for the reflective layer 112 since it has a high thermal conductivity. The thicker the reflective layer 112, the higher the thermal diffusion function. However, when it is excessively thick, the thermal diffusion function is excessively high, which deteriorates the recording sensitivity of the recording layer 115. Accordingly, the film thickness of the reflective layer 112 is preferably in the range of 30 nm to 200 nm.

The first dielectric layer 113 is located between the recording layer 115 and the reflective layer 112 and has a thermal function for adjusting thermal diffusion from the recording layer 115 to the reflective layer 112 and an optical function for adjusting, for example, reflectance and absorptance. Examples of the material that can be used for the first dielectric layer include simple substances of oxides such as $ZrO_2$, $HfO_2$, $ZnO$, $SiO_2$, $SnO_2$, $Cr_2O_3$, $TiO_2$, $In_2O_3$, $Ga_2O_3$, $Y_2O_3$, $CeO_2$, and $DyO_2$, simple substances of sulfides such as $ZnS$ and $CdS$, and mixtures thereof. Examples of the mixtures that can be used include $ZrO_2$—$SiO_2$, $ZrO_2$—$SiO_2$—$Cr_2O_3$, $ZrO_2$—$SiO_2$—$Ga_2O_3$, $HfO_2$—$SiO_2$—$Cr_2O_3$, $ZrO_2$—$SiO_2$—$In_2O_3$, and $ZnS$—$SiO_2$. When the first dielectric layer 113 is excessively thick, the cooling effect of the reflective layer 112 is reduced and the thermal diffusion from the recording layer 115 is reduced, which makes it difficult for the recording material to become amorphous. Furthermore, when the first dielectric layer is excessively thin, the cooling effect of the reflective layer 112 increases and the thermal diffusion from the recording layer 115 increases, which deteriorates recording sensitivity. The film thickness of the first dielectric layer 113 is preferably in the range of 5 nm to 40 nm.

The first interface layer 114 has a function for preventing mass transfer from occurring between the first dielectric layer 113 and the recording layer 115 due to repetitive recording. Preferably, the first interface layer 114 has a high melting point that prevents it from being melted during recording, and it is formed of a material with good adhesion to the recording layer 115. Examples of the material that can be used for the first interface layer 114 include simple substances of oxides such as $ZrO_2$, $HfO_2$, $ZnO$, $SiO_2$, $SnO_2$, $Cr_2O_3$, $TiO_2$, $In_2O_3$, $Ga_2O_3$, $Y_2O_3$, $CeO_2$, and $DyO_2$, and mixtures thereof, for instance, $ZrO_2$—$SiO_2$, $ZrO_2$—$SiO_2$—$Cr_2O_3$, $ZrO_2$—$SiO_2$—$Ga_2O_3$, $HfO_2$—$SiO_2$—$Cr_2O_3$, and $ZrO_2$—$SiO_2$—$In_2O_3$. Furthermore, for example, C also can be used. The first interface layer 114 cannot exhibit the effect as an interface layer when being excessively thin, while it hinders the function of the first dielectric layer 113 when being excessively thick. The film thickness of the first interface layer 114 is preferably in the range of 0.3 nm to 15 nm.

The second dielectric layer 117 is disposed on the laser beam incident side with respect to the recording layer 115 and has a function for preventing the recording layer 115 from, for example, being eroded and deformed, and an optical function for adjusting, for example, reflectance and absorptance. The same materials as those that are used for the first dielectric layer 113 can be used for the second dielectric layer 117. The film thickness of the second dielectric layer 117 can be determined so that a great change in reflectance is obtained between the crystalline phase and the amorphous phase of the recording layer 115. The film thickness of the second dielectric layer 117 is preferably in the range of 20 nm to 80 nm.

Like the first interface layer 114, the second interface layer 116 has a function for preventing mass transfer from occurring between the second dielectric layer 117 and the recording layer 115 due to repetitive recording. Accordingly, the material for the second interface layer 116 is preferably one with similar performance to that of the first interface layer 114. The film thickness of the second interface layer 116 is preferably in the range of 0.3 nm to 15 nm.

The first information layer 11 is formed of the aforementioned reflective layer 112, first dielectric layer 113, first interface layer 114, recording layer 115, second interface layer 116, and second dielectric layer 117.

The separation layer 12 is provided for differentiating the focal positions of the first information layer 11 and the second information layer 13. The thickness of the separation layer 12 is desirably equal to or more than the focal depth that is determined according to the numerical aperture NA of the objective lens 5 and the wavelength λ of the laser beam 4. On the other hand, all information layers separated with the separation layer 12 (in this embodiment, the first information layer 11 and the second information layer 13) need to be placed in a range where light can be focused through the objective lens 5. For that purpose, a thinner separation layer 12 is preferred. The thickness of the separation layer 12 is preferably in the range of 5 μm to 50 μm, if λ=405 nm and NA=0.85.

Preferably, the separation layer 12 has low optical absorption with respect to the laser beam 4. A guide groove for guiding the laser beam 4 may be formed at the surface of the separation layer 12 on the second information layer 13 side. The material that can be used for the separation layer 12 is, for example, polycarbonate resin, polymethyl methacrylate resin, polyolefin resin, norbornene resin, ultraviolet curable resin, slow-acting thermosetting resin, or glass, or a suitable combination thereof.

Next, the respective layers that compose the second information layer 13 are described.

As described above, the second information layer 13 includes the transmittance adjusting layer 131, the reflective layer 132, the first dielectric layer 133, the first interface layer 134, the recording layer 135, the second interface layer 136, and the second dielectric layer 137 in this order from the side near to the first information layer 11.

The recording layer 135 has the same function as that of the recording layer 115 of the first information layer 11 described above and the same material can be used. However, in order to increase the transmittance of the second information layer 13, the film thickness of the recording layer 135 is preferably 15 nm or less and more preferably 9 nm or less. For example, the thickness of the recording layer 135 can be in the range of 1 nm to 15 nm (more preferably in the range of 1 nm to 9 nm).

The reflective layer 132 has the same function as that of the reflective layer 132 of the first information layer 11 described above and the same material can be used. However, in order to increase the transmittance of the second information layer 13, the film thickness of the reflective layer 132 is preferably 18 nm or less and more preferably in the range of 1 nm to 15 nm.

The first dielectric layer 133 has the same function as that of the first dielectric layer 113 of the first information layer 11 described above and the same material can be used. The film thickness of the first dielectric layer 133 is preferably in the range of 5 nm to 30 nm.

The first interface layer 134 has the same function as that of the first interface layer 114 of the first information layer 11 described above and the same material can be used. The film thickness of the first interface layer 134 is preferably in the range of 0.3 nm to 15 nm.

The second dielectric layer 137 has the same function as that of the second dielectric layer 117 of the first information layer 11 described above and the same material can be used. The film thickness of the first dielectric layer 137 is preferably in the range of 15 nm to 60 nm.

The second interface layer 136 has the same function as that of the second interface layer 116 of the first information layer 11 described above and the same material can be used. The film thickness of the second interface layer 136 is preferably in the range of 0.3 nm to 15 nm.

The transmittance adjusting layer 131 has a function for adjusting transmittance of the second information layer 13. This transmittance adjusting layer 131 makes it possible to increase both the transmittance Tc (%) of the second information layer 13 obtained when the recording layer 135 is in the crystalline phase and the transmittance Ta (%) of the second information layer 13 obtained when the recording layer 135 is in the amorphous phase.

The refractive index $n_t$ and extinction coefficient $k_t$ of the transmittance adjusting layer 131 are preferably $n_t \geq 2.4$ and $k_t < 0.1$ in order to increase the transmittances Tc and Ta of the first information layer 13. The transmittance adjusting layer 131 contains an element M, Nb, and oxygen (O). The content of Nb in the transmittance adjusting layer 131 is at least 2.9 atom %. Therefore, a mixture of oxide of Nb and oxide of element M can be used for the material for the transmittance adjusting layer 131. Particularly, it is preferable that an oxide of Nb, specifically $Nb_2O_5$, or a material containing $Nb_2O_5$ be used. A material containing $Nb_2O_5$ has a high refractive index and therefore has a great effect of increasing the transmittance of the second information layer 13 and has a stable high deposition rate. Accordingly, it is advantageous for manufacturing the information recording medium 2. Furthermore, mixing an oxide of element M with $Nb_2O_5$ allows a highly reliable transmittance adjusting layer 131 to be obtained even under high temperature/high humidity conditions.

Desirably, the material for the transmittance adjusting layer 131 contains at least 8.6 atom % (for instance, at least 9 atom % or at least 15 atom %) of Nb in order to obtain a sufficiently high deposition rate and less variation in deposition rate that is caused by moisture (higher deposition rate stability). The use of, for example, a material represented by the following formula (1) is preferable:

$Nb_xM_yO_{100-x-y}$ (atom %)   (1), where x and y satisfy $x \geq 8.6$, $y > 0$, and $x+y \leq 37$. In order to obtain a more reliable effect, a material in which x satisfies $x \geq 9$ or $x \geq 15$ may be used.

In the present specification, the formula "$Nb_xM_yO_{100-x-y}$ (atom %)" denotes a composition formula that is expressed with the total number of "Nb" atoms, "M" atoms, and "O" atoms being considered as a reference (100%).

Furthermore, when a preferable material for the transmittance adjusting layer 131 is expressed in terms of oxides, it is preferable that the transmittance adjusting layer 131 contain at least 10 mol % of $Nb_2O_5$ and at least 30 mol % of $Nb_2O_5$ in order to obtain a sufficiently high deposition rate and higher deposition rate stability. In this case, it is preferable that, for example, a material represented by the following formula (2) be used as the material contained in the transmittance adjusting layer 131:

$(Nb_2O_5)_z(M\text{-}O)_{100-z}$ (mol %)   (2), where M-O denotes an oxide of element M and z satisfies $z \geq 30$.

The formula "$(Nb_2O_5)_z(M\text{-}O)_{100-z}$ (mol %)" denotes a mixture of z mol % of $Nb_2O_5$ and (100-z) mol % of oxide of element M. In the present specification, mixtures of oxides may be indicated by the same notation system.

The transmittance adjusting layer 131 may be formed of a material composed only of element M, Nb, and oxygen (O) or may be formed of a material containing elements other than the element M, Nb, and oxygen (O). When the transmittance adjusting layer 131 contains other elements, it is preferable that the total content of the element M, Nb, and oxygen (O) be at least 90 atom %. Furthermore, when it is expressed in terms of oxides, it is preferable that the transmittance adjusting layer 131 contain at least 90 mol % of oxide of Nb and oxide of element M in total.

In order to increase the transmittances Tc and Ta more effectively, it is preferable that the thickness d of the transmittance adjusting layer 131 satisfy $\lambda/32n_t \leq d \leq \lambda/4n_t$ and it is more preferable particularly that it satisfy $d=\lambda/8n_t$, where $\lambda$ is a wavelength of the laser beam 4, and $n_t$ is a refractive index of the transmittance adjusting layer 131. Preferably, the thickness of the transmittance adjusting layer 131 is in the range of, for example, 5 nm to 36 nm, with consideration given to other conditions such as reflectance.

The second information layer 13 is formed of the aforementioned transmittance adjusting layer 131, reflective layer 132, first dielectric layer 133, first interface layer 134, recording layer 135, second interface layer 136, and second dielectric layer 137.

The transparent layer 3 is disposed on the laser beam incident side with respect to the second information layer 13 and serves to protect the information layers 11 and 13. Preferably, the transparent layer 3 has less optical absorption with respect to the laser beam 4. Examples of materials that can be used for the transparent layer 3 include polycarbonate resin, polymethyl methacrylate resin, polyolefin resin, norbornene resin, ultraviolet curable resin, slow-acting thermosetting resin, and glass, and suitable combinations thereof. Furthermore, sheets made of such materials also may be used. With respect to the film thickness of the transparent layer 3, the function for protecting the information layers cannot be exhibited when it is excessively thin, while the distance from the laser beam incident side of the information recording medium 2 to each information layer becomes longer than the focal length of the objective lens 5 and prevents the laser beam from being focused on the recording layers when it is excessively thick. If NA=0.85, the film thickness of the transparent layer is preferably in the range of 5 μm to 150 μm and more preferably in the range of 15 μm to 50 μm.

The information recording medium 2 can be manufactured by the method described below.

First, a first information layer 11 is stacked on a substrate 1 (with a thickness of, for example, 1.1 mm). The first information layer 11 is formed of a multilayer film, and the respective layers thereof can be formed by sequential sputtering. Since the substrate 1 may have high hygroscopicity depending on the material to be used, a step of annealing the substrate (hereinafter, referred to as a "substrate annealing step", "annealing step" or "substrate annealing treatment") may be carried out to remove moisture before sputtering if required.

Each layer can be formed by sputtering a sputtering target of the material that composes each layer in an atmosphere of rare gas such as Ar gas, Kr gas, or Xe gas or an atmosphere of mixed gas of rare gas and reactive gas (at least one gas selected from oxygen gas and nitrogen gas). With respect to the sputtering method, the DC sputtering method and RF sputtering method are used selectively as necessary. Since the composition of each layer deposited by sputtering does not coincide completely with the original composition of the sputtering target, it is necessary to determine the composition of the sputtering target, with consideration given to a composition deviation caused by sputtering depending on the material. However, as in the case of the material to be used, for example, for the transmittance adjusting layer of the information recording medium of the present invention, when it is a material that tends not to cause a composition deviation by sputtering, such a composition deviation need not be considered. Accordingly, in such a case, a sputtering target whose composition is identical to that of the film to be obtained can be used to obtain a film with a desired composition. Furthermore, for example, in the case of oxide, sputtering tends to cause oxygen deficiency. In that case, use of oxygen gas as reactive gas can compensate the oxygen deficiency. The sputtering target and the film obtained by depositing the sputtering target can be analyzed with, for example, an X-ray micro analyzer and thereby the compositions thereof can be checked.

With respect to the procedure for manufacturing the first information layer 11, specifically, a reflective layer 112 is deposited on the substrate 1 first. The reflective layer 112 can be formed by sputtering a sputtering target formed of metal or an alloy that composes the reflective layer 112 in a rare gas atmosphere or in an atmosphere of mixed gas of rare gas and reactive gas.

Subsequently, a first dielectric layer 113 is deposited on the reflective layer 112. The first dielectric layer 113 can be formed by sputtering a sputtering target formed of a compound that composes the first dielectric layer 113 in a rare gas atmosphere or in an atmosphere of mixed gas of rare gas and reactive gas.

Subsequently, a first interface layer 114 is formed on the first dielectric layer 113. The first interface layer 114 can be formed by sputtering a sputtering target formed of a compound that composes the first interface layer 114 in a rare gas atmosphere or in an atmosphere of mixed gas of rare gas and reactive gas.

Subsequently, a recording layer 115 is deposited on the first interface layer 114. The recording layer 115 can be formed by sputtering a sputtering target formed of a compound that composes the recording layer 115 in a rare gas atmosphere or in an atmosphere of mixed gas of rare gas and reactive gas.

Subsequently, a second interface layer 116 is deposited on the recording layer 115. The second interface layer 116 can be formed by sputtering a sputtering target formed of a compound that composes the second interface layer 116 in a rare gas atmosphere or in an atmosphere of mixed gas of rare gas and reactive gas.

Subsequently, a second dielectric layer 117 is deposited on the second interface layer 116. The second dielectric layer 117 can be formed by sputtering a sputtering target formed of a compound that composes the second dielectric layer 117 in a rare gas atmosphere or in an atmosphere of mixed gas of rare gas and reactive gas.

As described above, the first information layer 11 is stacked on the substrate 1 and thereafter, a separation layer 12 is formed.

The separation layer 12 can be produced by, for example, applying ultraviolet curable resin or slow-acting thermosetting resin onto the first information layer 11, rotating the whole to spread the resin uniformly (spin coating), and then curing the resin.

Next, with respect to the substrate 1 with the first information layer 11 and the separation layer 12 stacked thereon, a second information layer 13 is stacked on the side of the separation layer 12 (i.e. on the separation layer 12). The second information layer 13 is formed of a multilayer film as in the case of the first information layer 11, and the respective layers thereof can be formed by sequential sputtering. As in the case of the substrate 1, since the separation layer 12 may have high hygroscopicity depending on the material to be used, an annealing step may be carried out.

First, a transmittance adjusting layer 131 is deposited on the separation layer 12 (a transmittance adjusting layer deposition step). The transmittance adjusting layer 131 can be formed by sputtering a sputtering target (a first sputtering target) formed of a compound that composes the transmittance adjusting layer 131 in a rare gas atmosphere or in an atmosphere of mixed gas of rare gas and reactive gas. The material to be used for the transmittance adjusting layer 131 tends not to cause a composition deviation by sputtering. Accordingly, a sputtering target having the same composition as that of the transmittance adjusting layer 131 to be obtained can be used. Specifically, a sputtering target is used that contains element M, Nb, and oxygen (O) and has a content of Nb of at least 2.9 atom %. Therefore, a sputtering target containing a mixture of oxide of Nb and oxide of element M can be used. Particularly, it is preferable that oxide of Nb, specifically $Nb_2O_5$, or a sputtering target containing $Nb_2O$ be used. Since the material containing $Nb_2O$ allows a stable high deposition rate to be obtained, it is suitable for deposition of the transmittance adjusting layer 131 of the information recording medium 2. Furthermore, since less variation in deposition rate is caused by moisture, it also is possible to omit the substrate annealing step and therefore a further increase in efficiency can be achieved. In order to obtain a sufficiently high deposition rate and less variation in deposition rate that is caused by moisture (higher deposition rate stability), it is desirable to use a sputtering target containing at least 8.6 atom % (for instance, at least 9 atom %) of Nb. It is preferable that, for instance, a material represented by the aforementioned formula (1) be used. When the sputtering target to be used for the transmittance adjusting layer 131 is expressed in terms of oxides, it contains preferably at least 10 mol % of $Nb_2O_5$, and more preferably at least 30 mol % of $Nb_2O$ in order to obtain a sufficiently high deposition rate and higher deposition rate stability. In this case, it is preferable that, for example, a material represented by the aforementioned formula (2) be used. The sputtering target to be used here may be formed of a material composed only of element M, Nb, and oxygen (O) or may be formed of a material containing elements other than the element M, Nb, and oxygen (O). In the case where other components are contained, it is preferable that the total content of the element M, Nb, and oxygen (O) be at least 90 atom %. Moreover, when the sputtering target is expressed in terms of oxides, it is preferable that it contain at least 90 mol % of oxide of Nb and oxide of element M in total.

Subsequently, a reflective layer 132 is deposited on the transmittance adjusting layer 131 (a reflective layer deposition step). The reflective layer 132 can be formed by the same method as that used in the case of the reflective layer 112 described with respect to the method of forming the first information layer 11. For example, a sputtering target (a third sputtering target) can be used that contains, for example, at least one element selected from Ag, Au, Cu, and Al.

Subsequently, a first dielectric layer 133 is deposited on the reflective layer 132 (a first dielectric layer deposition step). The first dielectric layer 133 can be formed by the same method as that used in the case of the first dielectric layer 113 described with respect to the method of forming the first information layer 11.

Subsequently, a first interface layer 134 is deposited on the first dielectric layer 133 (a first interface layer deposition step). The first interface layer 134 can be formed by the same method as that used in the case of the first interface layer 114 described with respect to the method of forming the first information layer 11.

Subsequently, a recording layer 135 is deposited on the first interface layer 134 (a recording layer deposition step). The recording layer 135 can be formed by the same method as that used in the case of the recording layer 115 described with respect to the method of forming the first information layer 11. A sputtering target (a second sputtering target) containing at least one material selected from, for example, Ge—Sb—Te, Ge—Bi—Te, Ge—Sn—Te, Ge—Sb—Sn—Te, and Ge—Bi—Sn—Te can be used.

Subsequently, a second interface layer 136 is deposited on the recording layer 135 (a second interface layer deposition step). The second interface layer 136 can be formed by the same method as that used in the case of the second interface layer 116 described with respect to the method of forming the first information layer 11.

Subsequently, a second dielectric layer 137 is deposited on the second interface layer 136 (a second dielectric layer deposition step). The second dielectric layer 137 can be formed by the same method as that used in the case of the second dielectric layer 117 described with respect to the method of forming the first information layer 11.

Thus the second information layer 13 is stacked on the separation layer 12 and thereafter, a transparent layer 3 is formed on the second information layer 13.

The transparent layer 3 can be formed by, for example, applying ultraviolet curable resin or slow-acting thermosetting resin onto the second information layer 13, subjecting it to spin coating, and then curing the resin. The transparent layer 3 also can be formed using a substrate of, for example, disk-shaped polycarbonate resin, polymethyl methacrylate resin, polyolefin resin, norbornene resin, or glass. In this case, the transparent layer 3 can be formed by applying ultraviolet curable resin or slow-acting thermosetting resin onto the second information layer 13, subjecting it to spin coating after the substrate is allowed to adhere to the second information layer 13, and then curing the resin.

Generally, since the respective recording layers of the information recording medium 2 that are not subjected to any further processes after being deposited are in an amorphous state, an initialization step may be carried out in which crystallization is performed, for example, through laser beam irradiation as required.

Figure 15:
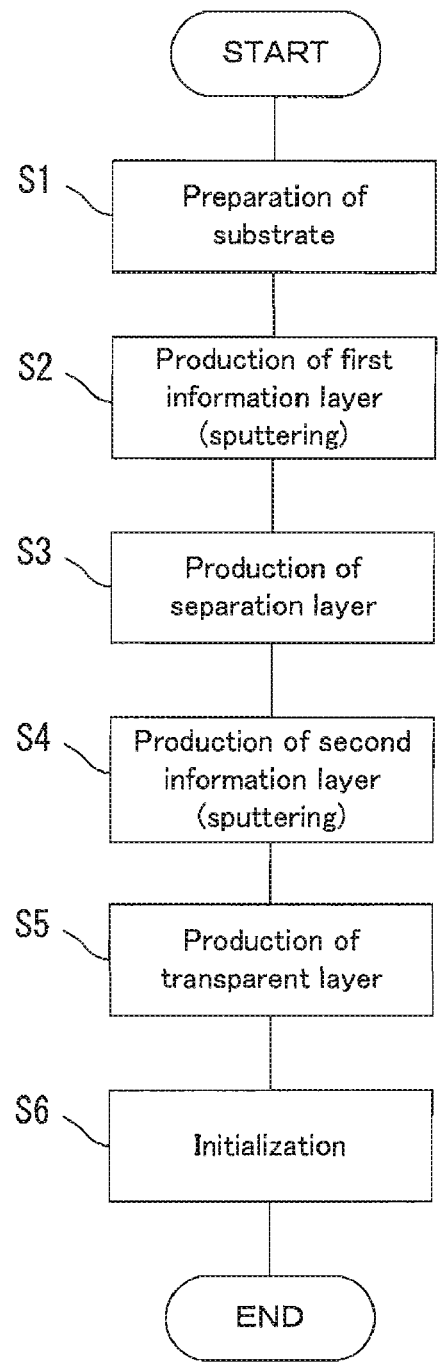
FIG. 15 is a flow chart showing an example of a method of manufacturing an information recording medium of the present invention, with a substrate annealing step being omitted in producing a transmittance adjusting layer.
Figure 16:
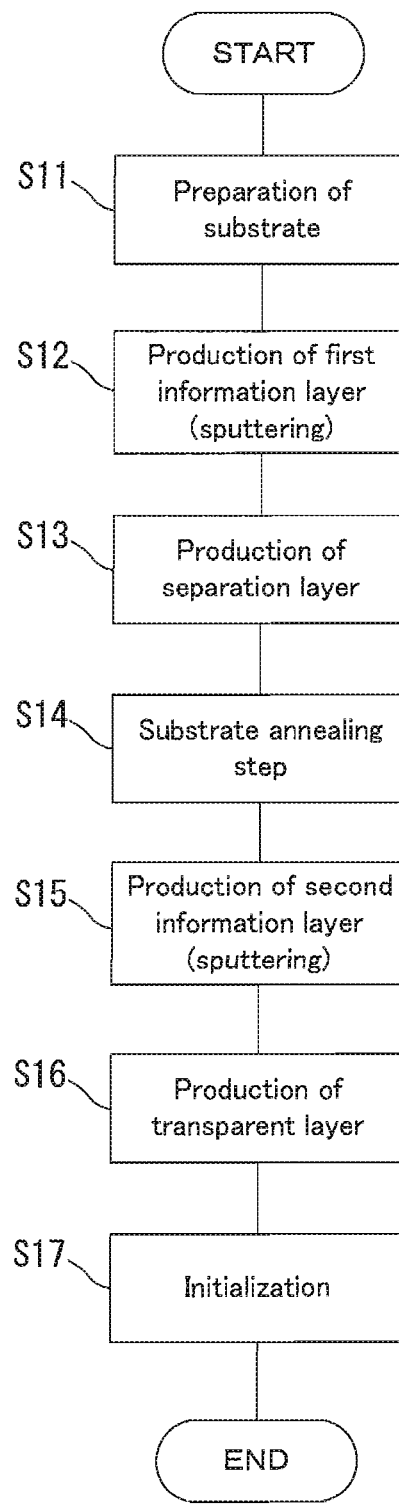
FIG. 16 is a flow chart showing an example of a conventional method of manufacturing an information recording medium including a substrate annealing step.

The information recording medium 2 of this embodiment can be manufactured in the manner as described above. As described above, in the information recording medium 2 of this embodiment, since the transmittance adjusting layer 131 is deposited using a material with less variation in deposition rate that is caused by moisture, it is possible to omit the substrate annealing treatment (substrate annealing step) in depositing the transmittance adjusting layer 131. In the method of manufacturing the information recording medium 2 in this embodiment, an example in which the substrate annealing step is omitted in producing the transmittance adjusting layer 131 is described with reference to the flow chart shown in FIG. 15. First, the substrate 1 is prepared (step S1), and respective layers that compose the first information layer 11 are deposited sequentially on the substrate 1 by sputtering (step S2). Subsequently, the separation layer 12 is produced on the first information layer 11 produced above (step S3). Next, the transmittance adjusting layer 131 is deposited on the separation layer 12 by sputtering, with no substrate annealing step being carried out. Subsequently, the reflective layer 132, first dielectric layer 133, first interface layer 134, recording layer 135, second interface layer 136, and second dielectric layer 137 are deposited sequentially and thereby the second information layer 13 is produced (step S4). Next, the transparent layer 3 is produced on the second information layer 13 (step S5), and finally initialization is carried out (step S6). For comparison, FIG. 16 shows a flow chart indicating a conventional method of manufacturing an information recording medium, which requires the substrate annealing step. As shown in FIG. 16, the conventional method requires the substrate annealing step (step S14) after preparation of the substrate 1 (step S11), deposition of the first information layer 11 by sputtering (step S12), and production of the separation layer 12 (step S13), which are the same as those carried out in the example of this embodiment shown in FIG. 15. After completion of the substrate annealing step, as in the case of the example of this embodiment, the transmittance adjusting layer 131 is deposited by sputtering. Thereafter, the respective layers of the second information layer 13 are deposited sequentially, and thus the second information layer is produced (step S15). Furthermore, production of the transparent layer 3 (step S16) and the initialization step (step S17) are carried out.

Figure 3:
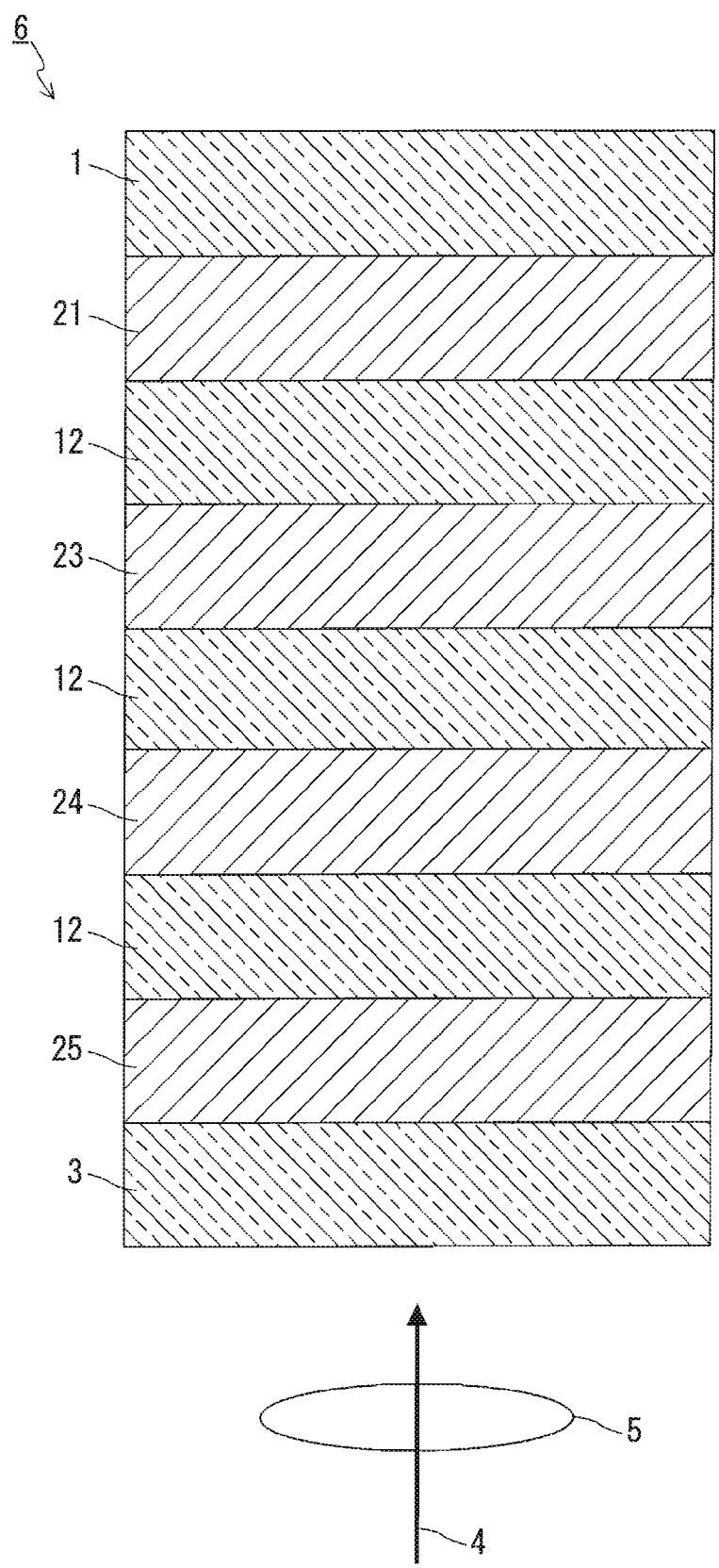
FIG. 3 is a sectional view showing still another structural example of an information recording medium of the present invention.

The information recording medium 2 shown in FIGS. 1 and 2 described above is an information recording medium including two information layers. However, the information recording medium of this embodiment may be an information recording medium 6 including four information layers as shown in FIG. 3. FIG. 3 shows a structural example obtained in the case of N=4 in the information recording medium of the present invention, i.e. a structural example of the information recording medium 6 including four information layers (a first information layer 21, a second information layer 23, a third information layer 24, and a fourth information layer 25). The first information layer 21 of such an information recording medium 6 can have the same structure as that of the first information layer 11 shown in FIGS. 1 and 2. Furthermore, at least one information layer (an information layer corresponding to the L-th information layer in the information recording medium of the present invention) selected from the second information layer 23, third information layer 24, and fourth information layer 25 of such an information recording medium 6 has basically the same film structure (a structure including a transmittance adjusting layer) as that of the second information layer 13 shown in FIG. 1 or 2. All the second to fourth information layers 23, 24, and 25 may have the same basic structure as that of the second information layer 13, or one information layer with a different film structure from that of the second information layer 13 may be included. That is, among the second to fourth information layers 23, 24, and 25, one information layer including no reflective layer or transmittance adjusting layer may be included.

In the information recording medium 6, a laser beam reaching the information layers disposed on the substrate 1 side with respect to the fourth information layer 25 and reflected light thereof attenuate by passing through the information layers disposed on the laser beam incident side with respect to that information layer. Therefore, the first information layer 21, second information layer 23, and third information layer 24 need to have high recording sensitivity and high reflectance, while the second information layer 23, third information layer 24, and fourth information layer 25 need to have high transmittance.

Figure 4:
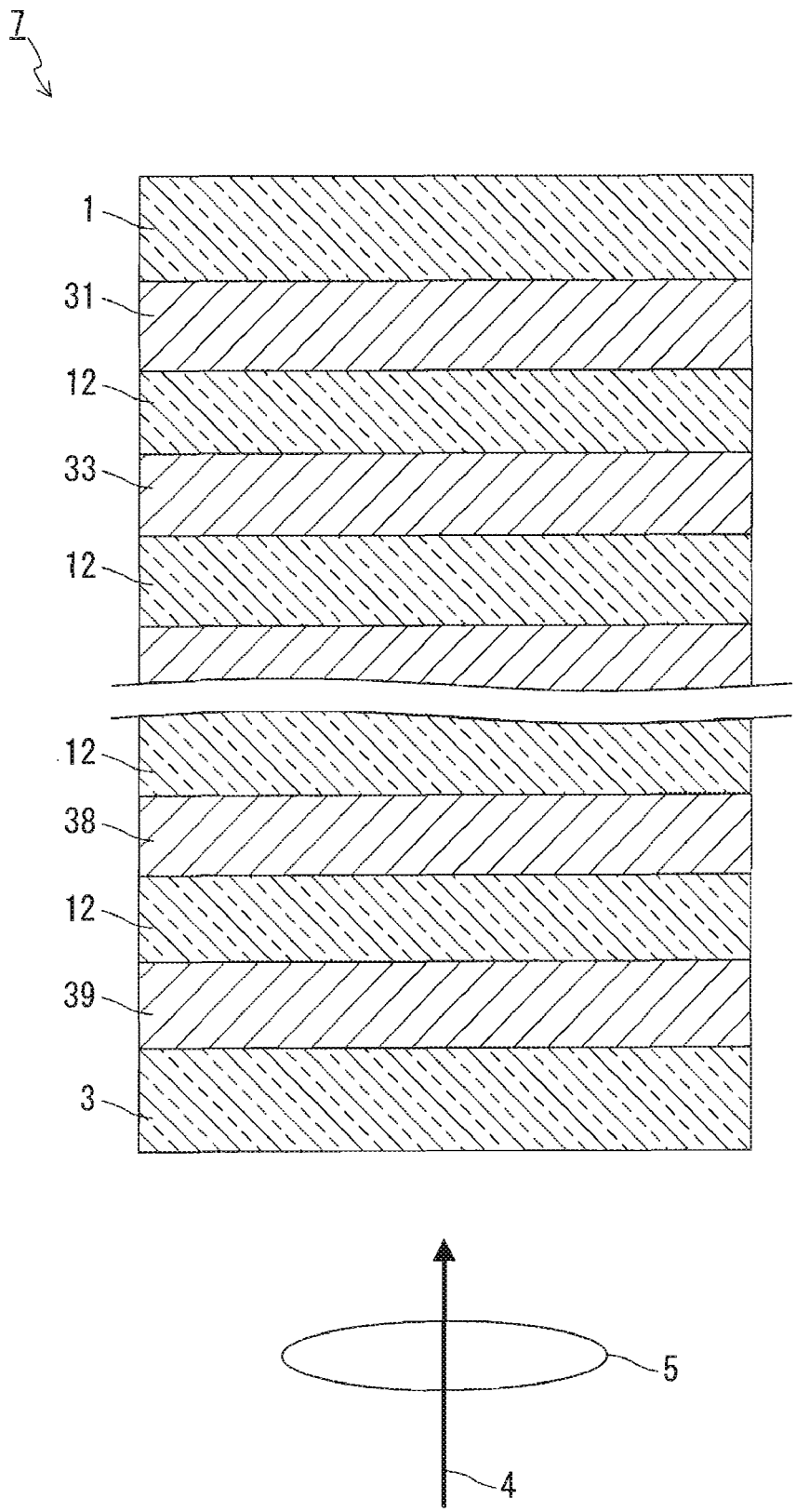
FIG. 4 is a sectional view showing yet another structural example of an information recording medium of the present invention.

Furthermore, the information recording medium of this embodiment may be more generally an information recording medium including N information layers (where N is an integer of 3 or more). FIG. 4 shows a structural example of an information recording medium 7 including N information layers (a first information layer 31, a second information layer 33, . . . , an (N−1)th information layer 38, and an N-th information layer 39). The first information layer 31 of such an information recording medium 7 can have the same film structure as that of the first information layer 11 shown in FIGS. 1 and 2. In such an information recording medium 7, at least one information layer (i.e. the information layer corresponding to the L-th information layer in the information recording medium of the present invention) selected from the second information layer 33, . . . , the (N−1)th information layer 38, and the N-th information layer 39 has basically the same structure (a structure including a transmittance adjusting layer) as that of the second information layer 13 shown in FIG. 1 or 2. All the second to N-th information layers 33, . . . , 38, and 39 may have the same structure as that of the second information layer 13 or one information layer with a different film structure from that of the second information layer 13 may be included. That is, among the second to N-th information layers 33, . . . , 38, and 39, one information layer including no reflective layer or transmittance adjusting layer may be included.

In the information recording medium 7, a laser beam reaching the information layers disposed on the substrate 1 side with respect to the N-th information layer 39 and reflected light thereof attenuate by passing through the information layers disposed on the laser beam incident side with respect to that information layer. Therefore, the first information layer 31, second information layer 33, . . . , and (N−1)th information layer 38 need to have high recording sensitivity and high reflectance, while the second information layer 33, third information layer 34, . . . , (N−1)th information layer 38, and N-th information layer 39 need to have high transmittance.

The information recording medium 6 including four information layers shown in FIG. 3 can be produced by the same method as that used for the information recording medium 2 including two information layers shown in FIGS. 1 and 2. That is, the first information layer 21, second information layer 23, third information layer 24, and fourth information layer 25 are stacked sequentially on the substrate 1, with separation layers 22 being interposed between the respective information layers. Further, the transparent layer 3 is formed on the fourth information layer 25. Thus, the information recording medium 6 can be produced.

The information recording medium 7 including N information layers shown in FIG. 4 also can be produced by the same method as that used for the information recording medium 2 including two information layers shown in FIGS. 1 and 2. The first information layer 31, second information layer 33, . . . , (N−1)th information layer 38, and N-th information layer 39 are stacked sequentially on the substrate 1, with separation layers 32 being interposed between the respective information layers. Thereafter, the transparent layer 3 is formed on the N-th information layer 39. Thus, the information recording medium 7 can be produced.

Generally, since the respective recording layers of the information recording medium 6 and information recording medium 7 that are not subjected to any further processes after being deposited are in an amorphous state, an initialization step may be carried out in which crystallization is performed, for example, through laser beam irradiation as required.

The information recording medium 6 and information recording medium 7 can be manufactured in the manner as described above.

Information recording media including at least two information layers capable of recording and reproducing information and methods of manufacturing the same were described above. However, the information recording medium of the present invention is not limited to those structures and manufacturing methods, as long as at least one information layer (the L-th information layer (where L is an integer satisfying $2 \leq L \leq N$)) includes a recording layer capable of undergoing a phase change, a reflective layer, and a transmittance adjusting layer in this order from the laser beam incident side.

For example, in an information recording medium including four information layers, two of the four information layers can be reproduction-only information layers, and the other two of them can be information layers each of which includes a recording layer that undergoes a phase change, a reflective layer, and a transmittance adjusting layer. Furthermore, the recording layer may be one that undergoes a reversible phase change or one that undergoes an irreversible phase change.

In this embodiment, the sputtering method was employed as a method of depositing the respective layers composing the information layers. However, the method is not limited thereto, and it also is possible to employ, for example, a vacuum deposition method, an ion plating method, or a MBE (Molecular Beam Epitaxy) method.

Embodiment 2

Figure 5:
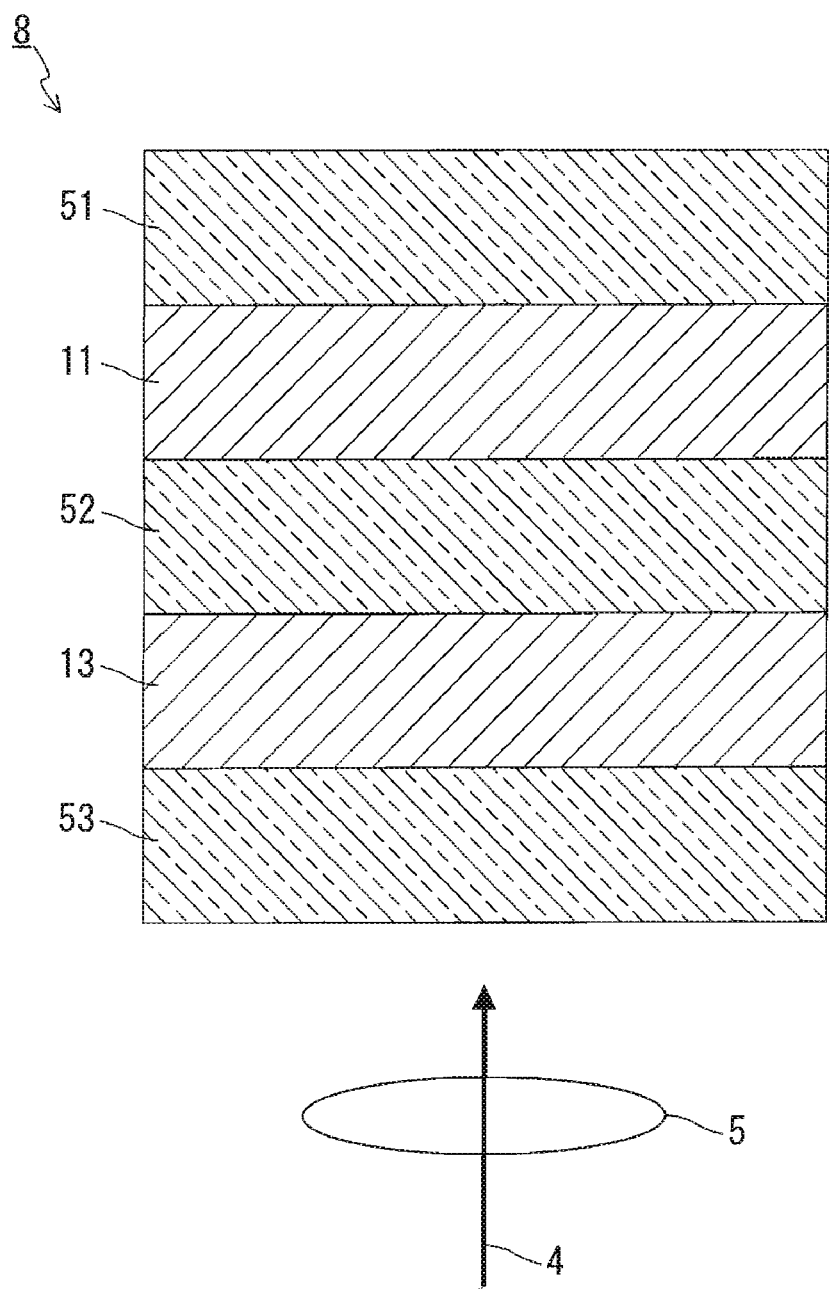
FIG. 5 is a sectional view showing a further structural example of an information recording medium of the present invention.

In Embodiment 2, another example of an information recording medium of the present invention is described. FIG. 5 shows a partial sectional view of the information recording medium according to Embodiment 2. The information recording medium 8 of this embodiment is an optical information recording medium that can record and reproduce information through irradiation with a laser beam 4 focused through an objective lens 5 as in the case of the information recording medium 2 described in Embodiment 1.

The information recording medium 8 has a structure in which a second information layer 13 and a first information layer 11 are stacked on a first substrate 53 and a second substrate 51, respectively, and the first information layer 11 and the second information layer 13 are bonded to each other with an adhesive layer 52 being interposed therebetween. That is, the information recording medium 8 of this embodiment is an example obtained when N=2 and L=2 in the information recording medium of the present invention, and the second information layer 13 corresponds to the N-th information layer and the L-th information layer. Furthermore, in the information recording medium 8 of this embodiment, the first substrate 53 side is the laser beam incident side.

Each of the first substrate 53 and second substrate 51 has a disk shape. Furthermore, the first substrate 53 is substantially transparent. Examples of the materials that can be used for the first substrate 53 and second substrate 51 include polycarbonate resin, polymethyl methacrylate resin, polyolefin resin, norbornene resin, and glass, and suitable combinations thereof as in the case of the substrate 1 described in Embodiment 1. A guide groove for guiding the laser beam 4 may be formed at each of the surfaces of the first substrate 53 located on the second information layer 13 side and the second substrate 51 located on the first information layer 11 side. Preferably, the thickness of the first substrate 53 and second substrate 51 is in the range of 0.3 mm to 0.9 mm so that they have sufficiently high strength and the thickness of the whole information recording medium 8 is around 1.2 mm.

For example, ultraviolet curable resin can be used as the material for the adhesive layer 52. Preferably, the thickness of the adhesive layer 52 is in the range of 5 μm to 50 μm for the same reason as that described with respect to the separation layer 12 of Embodiment 1.

Figure 6:
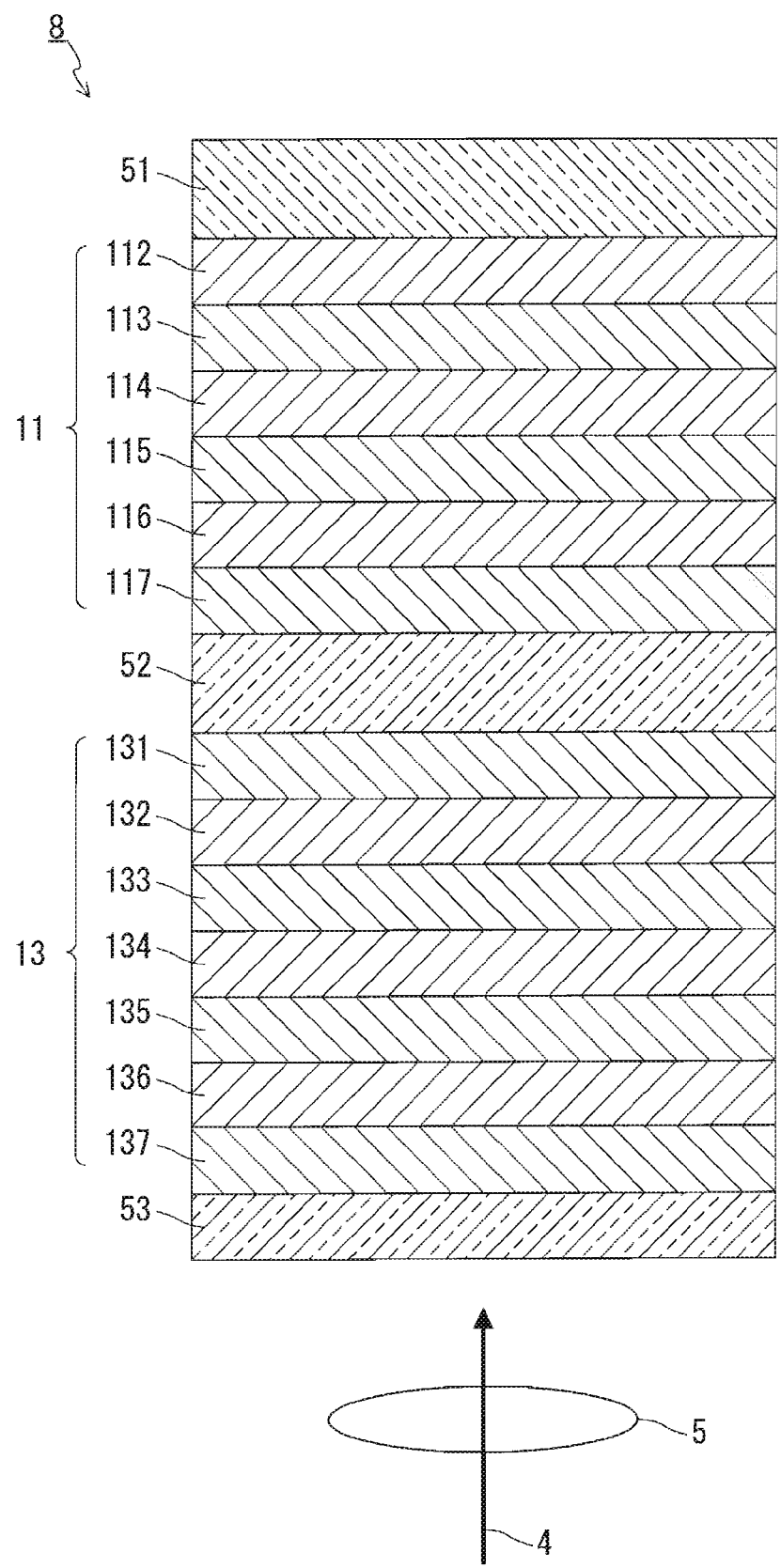
FIG. 6 is a sectional view showing still another structural example of an information recording medium of the present invention.

As shown in FIG. 6, the first information layer 11 and the second information layer 13 have the same film structures as those of the two information layers, respectively, included in the information recording medium 2 described in Embodiment 1. Accordingly, the descriptions of the respective layers included in the first information layer 11 and second information layer 13 are not repeated here.

The information recording medium 8 can be manufactured by the method described below.

First, a second information layer 13 is formed on a first substrate 53 (with a thickness of, for example, 0.6 mm). Specifically, a second dielectric layer 137, a second interface layer 136, a recording layer 135, a first interface layer 134, a first dielectric layer 133, a reflective layer 132, and a transmittance adjusting layer 131 are deposited sequentially on the first substrate 53 by sputtering. The respective layers can be deposited using the same method as in Embodiment 1.

The first information layer 11 is formed on a second substrate 51 (with a thickness of, for example, 0.6 mm). Specifically, a reflective layer 112, a first dielectric layer 113, a first interface layer 114, a recording layer 115, a second interface layer 116, and a second dielectric layer 117 are deposited sequentially on the second substrate 51 by sputtering. The respective layers can be deposited using the same method as in Embodiment 1.

Finally, the first substrate 53 and second substrate 51 with the respective layers stacked thereon are bonded to each other with an adhesive layer 52. That is, the first information layer 11 and the second information layer 13 are bonded to each other. Specifically, for example, ultraviolet curable resin may be applied onto the first information layer 11 stacked on the second substrate 51, the second information layer 13 stacked on the first substrate 53 may be allowed to adhere to the first information layer 11, which is subjected to spin coating, and the resin then may be cured.

The example described above is an specific example, in which the method of manufacturing an information recording medium of the present invention includes:
(I) a step of producing an N-th information layer to an m-th information layer (m is an integer satisfying $2 \leq m \leq N$) on a first substrate in this order,
(II) a step of producing a first information layer to an (m−1)th information layer on a second substrate in this order, and
(III) a step of bonding the m-th information layer and the (m−1)th information layer to each other,
wherein when L satisfies $m \leq L \leq N$, the step (I) includes the steps (i) to (iii) for producing the L-th information layer in the order of steps (iii), (ii), and (i), and when L satisfies $2 \leq L \leq m-1$, the step (II) includes the steps (i) to (iii) for producing the L-th information layer in the order of steps (i), (ii), and (iii). Specifically, the example described above is an example obtained when the second information layer 13 corresponds to the m-th information layer, and the first information layer 11 corresponds to the (m−1)th information layer. As described above, step (i) is the transmittance adjusting layer deposition step, step (ii) is the reflective layer deposition step, and step (iii) is the recording layer deposition step in the manufacturing method of the present invention.

Generally, since the respective recording layers of the information recording medium 8 that are not subjected to any further processes after being deposited are in an amorphous state, an initialization step may be carried out in which crystallization is performed, for example, through laser beam irradiation as required.

The information recording medium 8 can be manufactured in the manner as described above.

Figure 7:
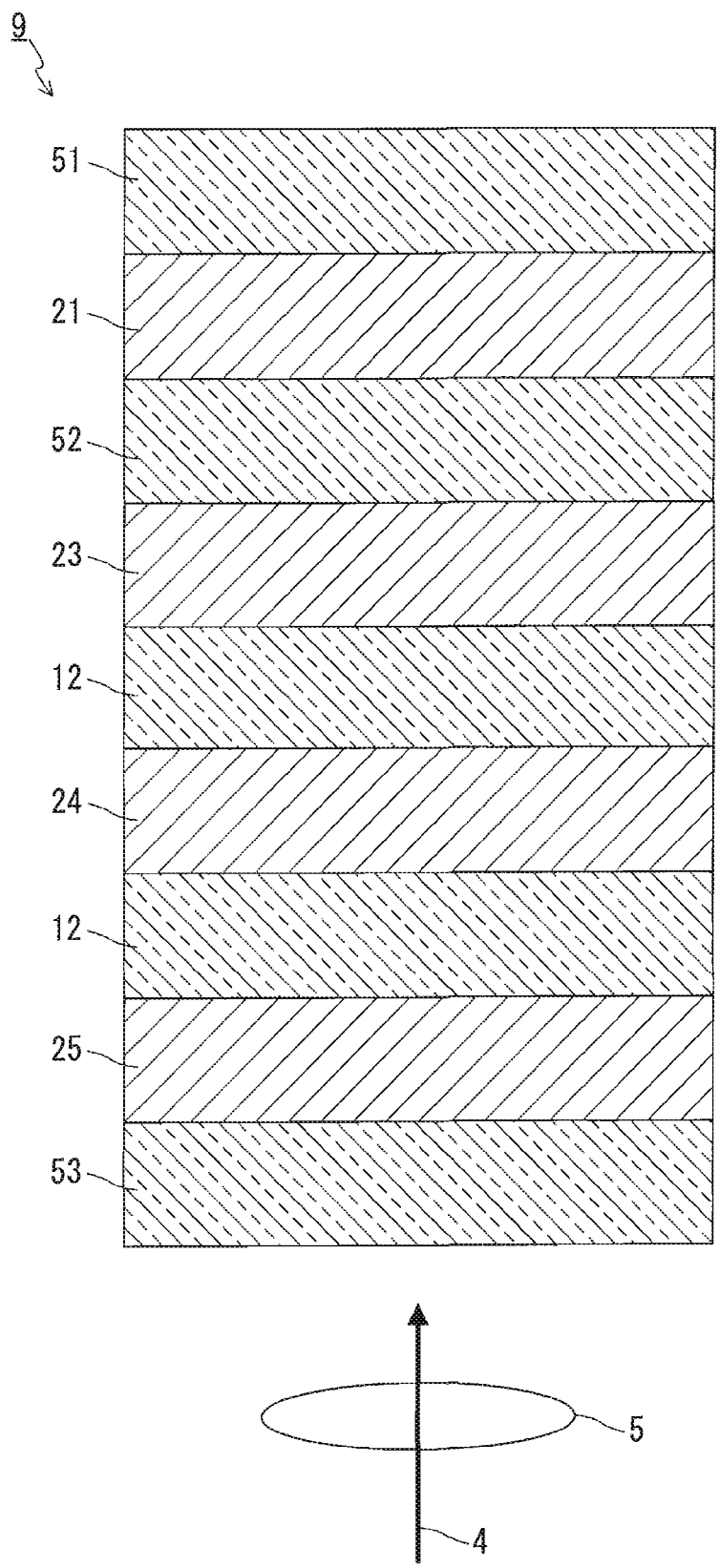
FIG. 7 is a sectional view showing yet another structural example of an information recording medium of the present invention.

Furthermore, the information recording medium 8 shown in FIGS. 5 and 6 described above is an information recording medium including two information layers. However, the information recording medium of this embodiment may be an information recording medium 9 including four information layers as shown in FIG. 7. FIG. 7 shows a structural example obtained in the case of N=4 in the information recording medium of the present invention, i.e. a structural example of the information recording medium 9 including four information layers (a first information layer 21, a second information layer 23, a third information layer 24, and a fourth information layer 25). The first information layer 21 of such an information recording medium 9 has the same film structure as that of the first information layer 11 shown in FIGS. 5 and 6. Furthermore, at least one information layer (information layer corresponding to the L-th information layer in the information recording medium of the present invention) selected from the second information layer 23, third information layer 24, and fourth information layer 25 of such an information recording medium 9 has basically the same structure (a structure including a transmittance adjusting layer) as that of the second information layer 13 shown in FIGS. 5 and 6. All the second to fourth information layers 23, 24, and 25 may have the same structure as that of the second information layer 13, or one information layer with a different film structure from that of the second information layer 13 may be included. That is, among the second to fourth information layers 23, 24, and 25, one information layer including no reflective layer or transmittance adjusting layer may be included.

In the information recording medium 9, a laser beam reaching the information layers disposed on the second substrate 51 side with respect to the fourth information layer 25 and reflected light thereof are attenuated by passing through the information layers disposed on the laser beam incident side with respect to the information layer concerned. Therefore, the first information layer 21, second information layer 23, and third information layer 24 need to have high recording sensitivity and high reflectance, while the second information layer 23, third information layer 24, and fourth information layer 25 need to have high transmittance.

Figure 8:
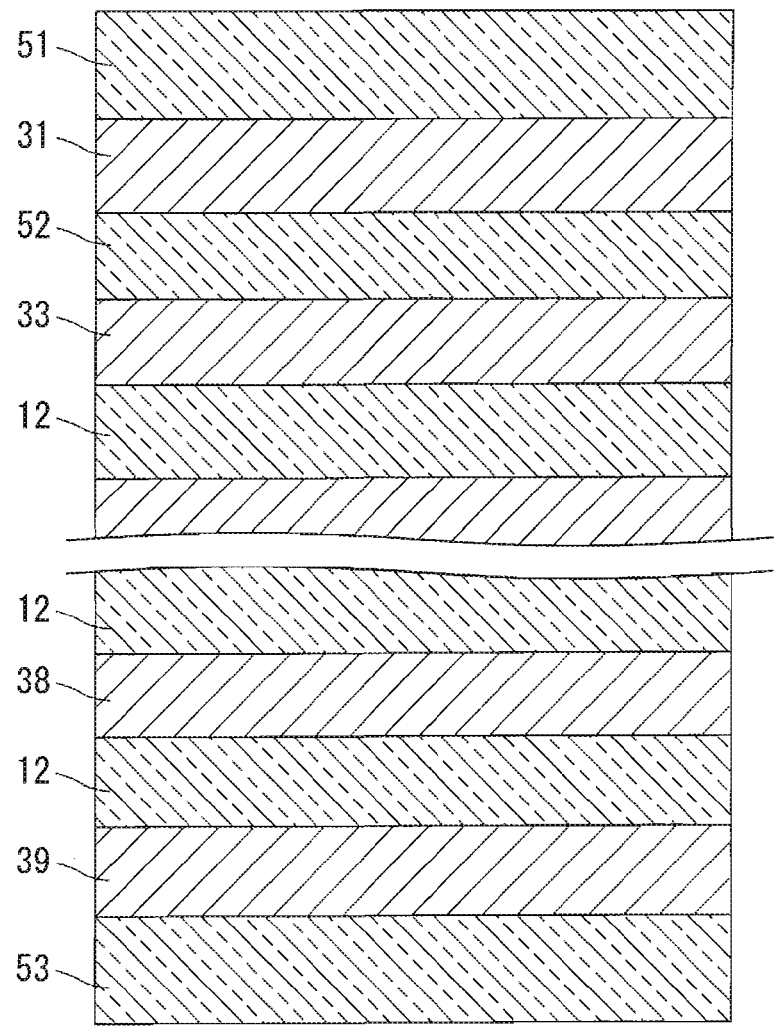
FIG. 8 is a sectional view showing a further structural example of an information recording medium of the present invention.
Figure 8:
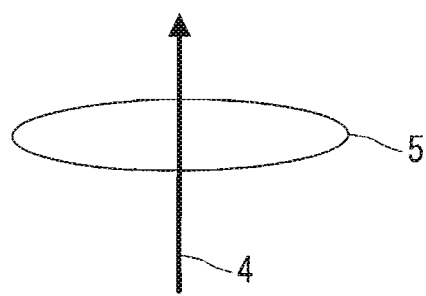

Furthermore, the information recording medium of this embodiment may be more generally an information recording medium including N information layers (where N is an integer of 3 or more). FIG. 8 shows a structural example of an information recording medium 10 including N information layers (a first information layer 31, a second information layer 33, . . . , an (N−1)th information layer 38, and an N-th information layer 39). The first information layer 31 of such an information recording medium 10 can have the same structure as that of the first information layer 11 shown in FIGS. 5 and 6. In such an information recording medium 10, at least one information layer (i.e. the information layer corresponding to the L-th information layer in the information recording medium of the present invention) selected from the second information layer 33, . . . , the (N−1)th information layer 38, and the N-th information layer 39 has basically the same structure (a structure including a transmittance adjusting layer) as that of the second information layer 13 shown in FIGS. 5 and 6. All the second to N-th information layers 33, . . . , 38, and 39 may have the same structure as that of the second information layer 13 or one information layer with a different film structure from that of the second information layer 13 may be included. That is, among the second to N-th information layers 33, ..., 38, and 39, one information layer including no reflective layer or transmittance adjusting layer may be included.

In the information recording medium 10, a laser beam reaching the information layers disposed on the second substrate 51 side with respect to the N-th information layer 39 and reflected light thereof attenuate by passing through the information layers disposed on the laser beam incident side with respect to the information layer concerned. Therefore, the first information layer 31, second information layer 33, ..., and (N−1)th information layer 38 need to have high recording sensitivity and high reflectance, while the second information layer 33, ..., (N−1)th information layer 38, and N-th information layer 39 need to have high transmittance.

The information recording medium 9 including four information layers shown in FIG. 7 can be produced by the same method as that used for the information recording medium 8 including two information layers shown in FIGS. 5 and 6. That is, the fourth information layer 25, third information layer 24, and second information layer 23 (the m-th information layer) are formed sequentially on the first substrate 53, with separation layers 12 being interposed between the respective information layers. The separation layer 12 is formed by the same method as that described in Embodiment 1.

Furthermore, the first information layer 21 (the (m−1)th information layer) is formed on the second substrate 51.

Finally, the first substrate 53 and second substrate 51 with the respective information layers stacked thereon are bonded to each other using an adhesive layer 52. As in the case of the information recording medium 8, for example, ultraviolet curable resin may be applied onto the first information layer 11 stacked on the second substrate 51, the second information layer 13 stacked on the first substrate 53 may be allowed to adhere to the first information layer, which is subjected to spin coating, and the resin may then be cured.

The information recording medium 10 including N information layers shown in FIG. 8 also can be produced by the same method as that employed for the information recording medium 9 including four information layers shown in FIG. 7.

First, the N-th information layer 39, the (N−1)th information layer 38, ..., and the second information layer 33 (the m-th information layer) are formed sequentially on the first substrate 53, with separation layers 12 being interposed between the respective information layers. The separation layers 12 are formed by the same method as that described in Embodiment 1.

Furthermore, a first information layer 31 (the (m−1)th information layer) is formed on the second substrate 51.

Finally, the first substrate 53 and second substrate 51 with the respective information layers stacked thereon are bonded to each other using an adhesive layer 52. As in the case of the information recording medium 8, for example, ultraviolet curable resin may be applied onto the first information layer 31 stacked on the second substrate 51, the second information layer 33 stacked above the first substrate 53 may be allowed to adhere to the first information layer, which is subjected to spin coating, and the resin may then be cured.

Generally, since the respective recording layers of the information recording medium 9 and the information recording medium 10 that are not subjected to any further processes after being deposited are in an amorphous state, an initialization step may be carried out in which crystallization is performed, for example, through laser beam irradiation as required.

The information recording medium 9 and the information recording medium 10 can be manufactured in the manner as described above.

Hereinbefore, information recording media including at least two information layers capable of recording and reproducing information and methods of manufacturing the same are described. However, the information recording media of the present invention are not limited to those structures and manufacturing methods, as long as at least one information layer (the L-th information layer (L is an integer satisfying $2 \leq L \leq N$)) includes a recording layer that undergoes a phase change, a reflective layer, and a transmittance adjusting layer in this order from the laser beam incident side.

For example, in an information recording medium including four information layers, two of the four information layers can be reproduction-only information layers, and the other two can be information layers each of which includes a recording layer capable of undergoing a phase change, a reflective layer, and a transmittance adjusting layer. Furthermore, the recording layer may be one that undergoes a reversible phase change or may be one that undergoes an irreversible phase change.

In this embodiment, the sputtering method was employed as a method of depositing the respective layers composing the information layers. However, the method is not limited thereto, and it also is possible to employ, for example, a vacuum deposition method, an ion plating method, or a MBE (Molecular Beam Epitaxy) method.

Embodiment 3

Figure 9:
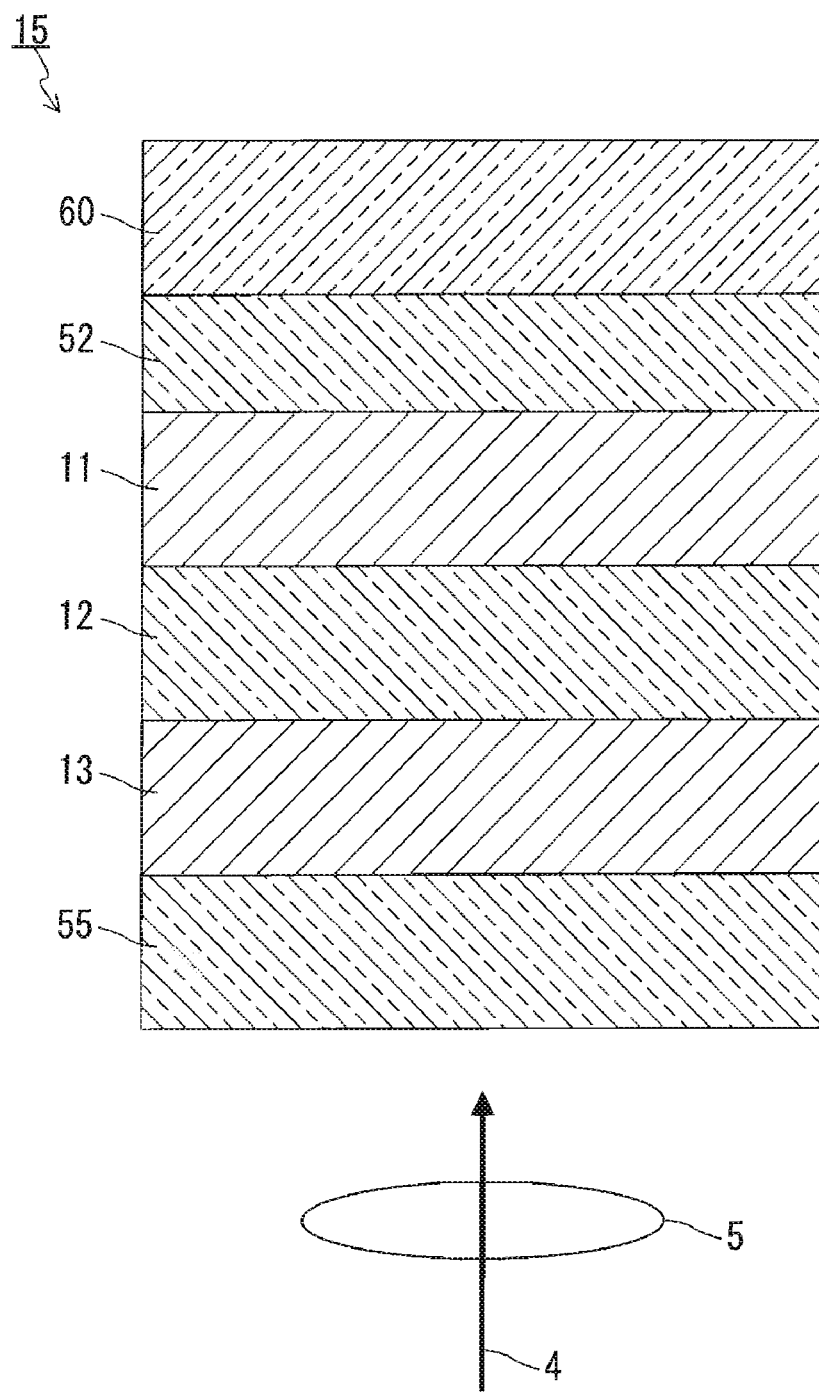
FIG. 9 is a sectional view showing still another structural example of an information recording medium of the present invention.

In Embodiment 3, another example of an information recording medium of the present invention is described. FIG. 9 shows a partial sectional view of the information recording medium according to Embodiment 3. The information recording medium 15 of this embodiment is an optical information recording medium that can record and reproduce information through irradiation with a laser beam 4 focused through an objective lens 5 as in the case of the information recording medium 2 described in Embodiment 1.

Figure 10:
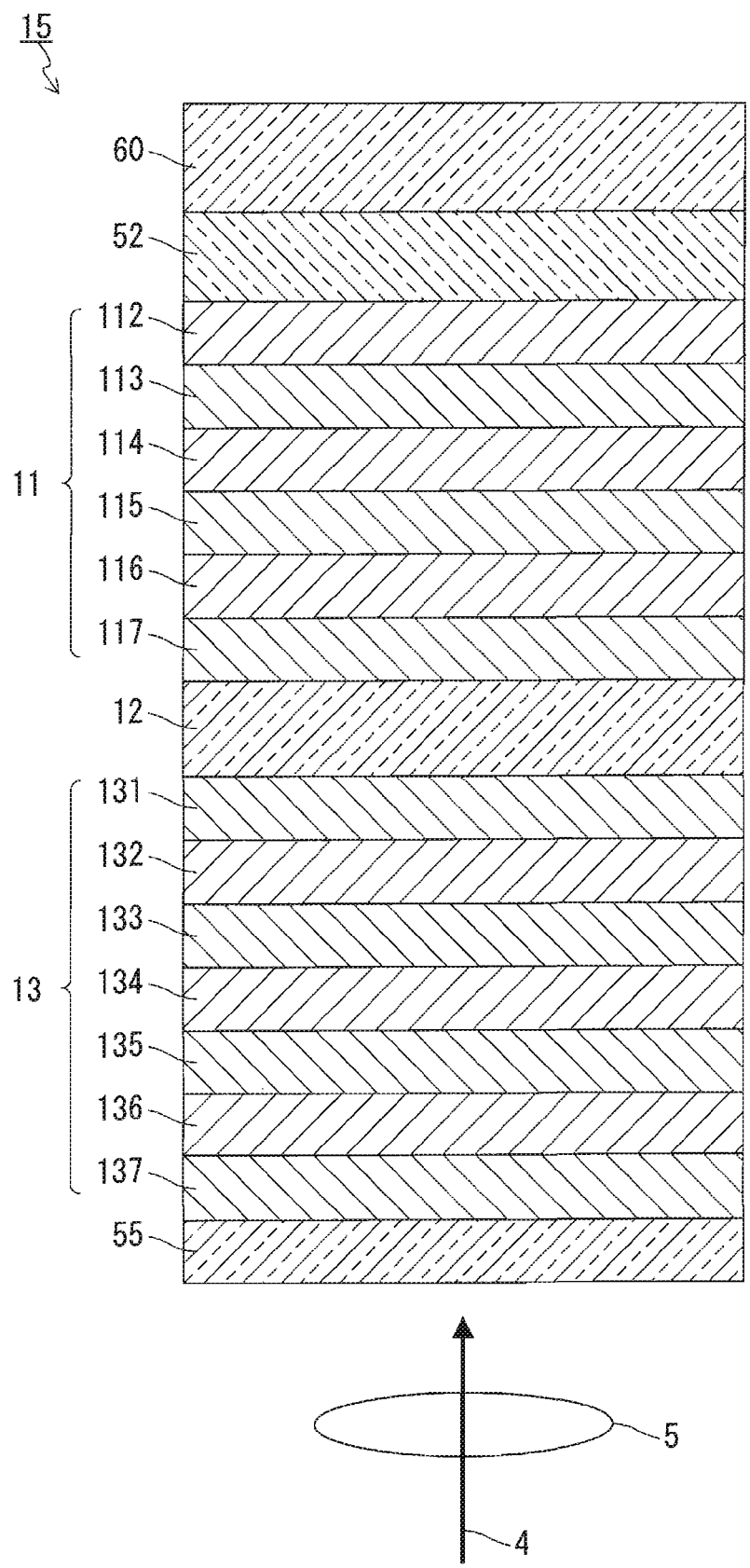
FIG. 10 is a sectional view showing yet another structural example of an information recording medium of the present invention.

The information recording medium 15 is formed by stacking a second information layer 13, a separation layer 12, and a first information layer 11 on a substrate 55 and bonding the first information layer 11 and a dummy substrate 60 together, with an adhesive layer 52 being interposed therebetween. That is, the information recording medium 15 of this embodiment has a structure obtained when N=2 and L=2 in the information recording medium of the present invention, and the second information layer 13 corresponds to the N-th information layer and the L-th information layer. Furthermore, in the information recording medium 15 of this embodiment, the substrate 55 side is the laser beam incident side. FIG. 10 is a partial sectional view showing, in detail, the film structure of the first information layer 11 and the second information layer 13 of the information recording medium 15 according to this embodiment.

The substrate 55 and the dummy substrate 60 each have a disk shape. Furthermore, the substrate 55 is substantially transparent. Examples of the materials that can be used for the substrate 55 and the dummy substrate 60 include polycarbonate resin, polymethyl methacrylate resin, polyolefin resin, norbornene resin, and glass, and suitable combinations thereof as in the case of the substrate 1 described in Embodiment 1. A guide groove for guiding the laser beam 4 may be formed at the surface of the substrate 55 located on the second information layer 13 side. Preferably, the thickness of the substrate 55 and the dummy substrate 61 is in the range of 0.3 mm to 0.9 mm so that they have sufficiently high strength and the thickness of the whole information recording medium 15 is around 1.2 mm.

For example, ultraviolet curable resin can be used as the material for the adhesive layer 52. Preferably, the thickness of the adhesive layer 52 is in the range of 5 μm to 50 μm for the same reason as that described with respect to the separation layer 12 of Embodiment 1.

As shown in FIG. 10, the first information layer 11 and the second information layer 13 have the same film structures as those of the two information layers, respectively, included in the information recording medium 2 described in Embodiment 1. Accordingly, the descriptions of the respective layers included in the respective information layers are not repeated here.

The information recording medium 15 can be manufactured by the method described below First, a second information layer 13 is formed on a substrate 55 (with a thickness of, for example, 0.6 mm). Specifically, a second dielectric layer 137, a second interface layer 136, a recording layer 135, a first interface layer 134, a first dielectric layer 133, a reflective layer 132, and a transmittance adjusting layer 131 are deposited sequentially on the substrate 55 by sputtering. In this case, an annealing step may be carried out before sputtering if required. The respective layers can be deposited using the same method as in Embodiment 1.

Thus, the second information layer 13 is stacked on the substrate 55, and thereafter, a separation layer 12 is formed in the same manner as in Embodiment 1.

Next, the first information layer 11 is stacked on the separation layer 12. Specifically, a second dielectric layer 117, a second interface layer 116, a recording layer 115, a first interface layer 114, a first dielectric layer 113, and a reflective layer 112 are deposited sequentially on the separation layer 12 by sputtering. The respective layers can be deposited using the same method as in Embodiment 1.

Finally, the substrate 55 with the first information layer 11 and the second information layer 13 stacked thereon and the dummy substrate 60 are bonded to each other with the adhesive layer 52. Specifically, for example, ultraviolet curable resin may be applied onto the first information layer 11 stacked above the substrate 55, the dummy substrate 60 may be allowed to adhere to the first information layer 11, which is subjected to spin coating, and the resin may then be cured.

Generally, since the respective recording layers of the information recording medium 15 that are not subjected to any further processes after being deposited are in an amorphous state, an initialization step may be carried out in which crystallization is performed, for example, through laser beam irradiation as required.

The information recording medium 15 of this embodiment can be manufactured in the manner as described above.

Figure 11:
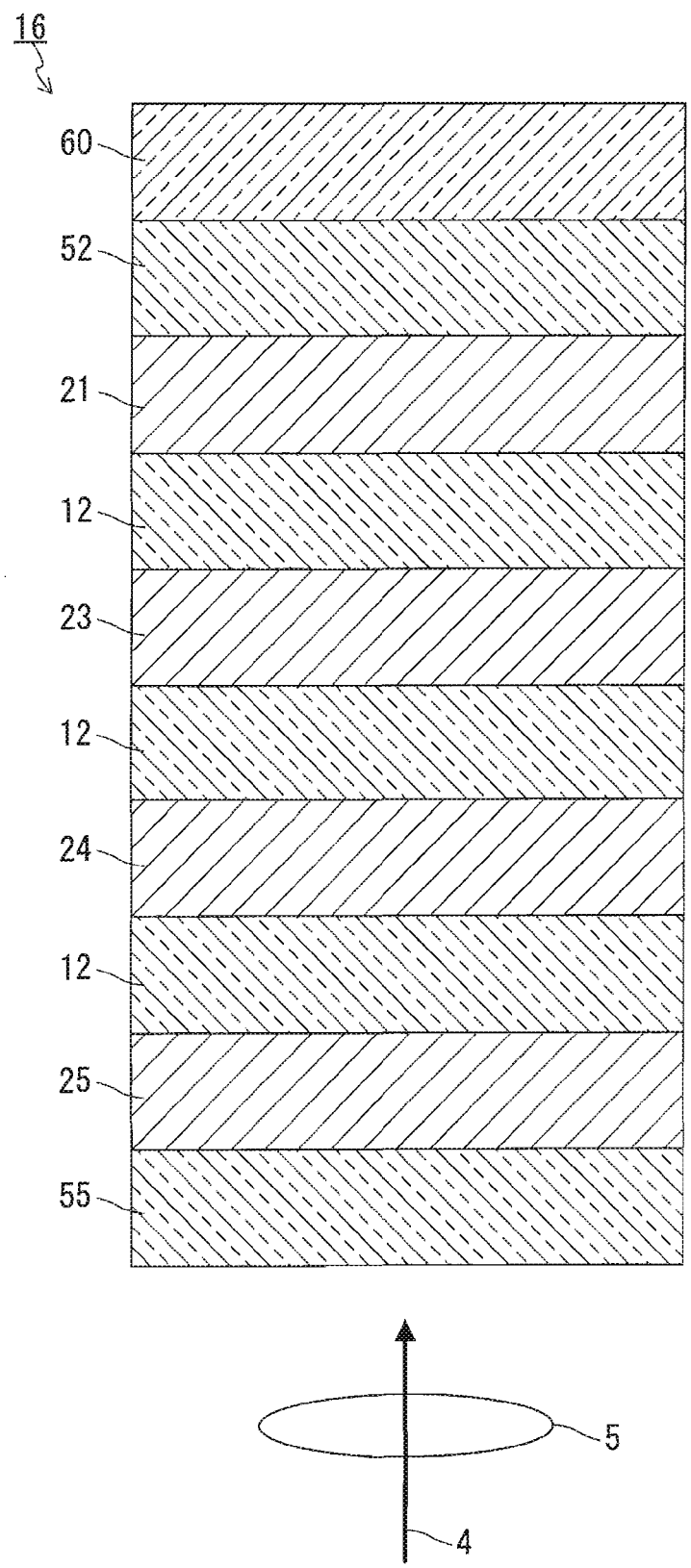
FIG. 11 is a sectional view showing a further structural example of an information recording medium of the present invention.
Figure 12:
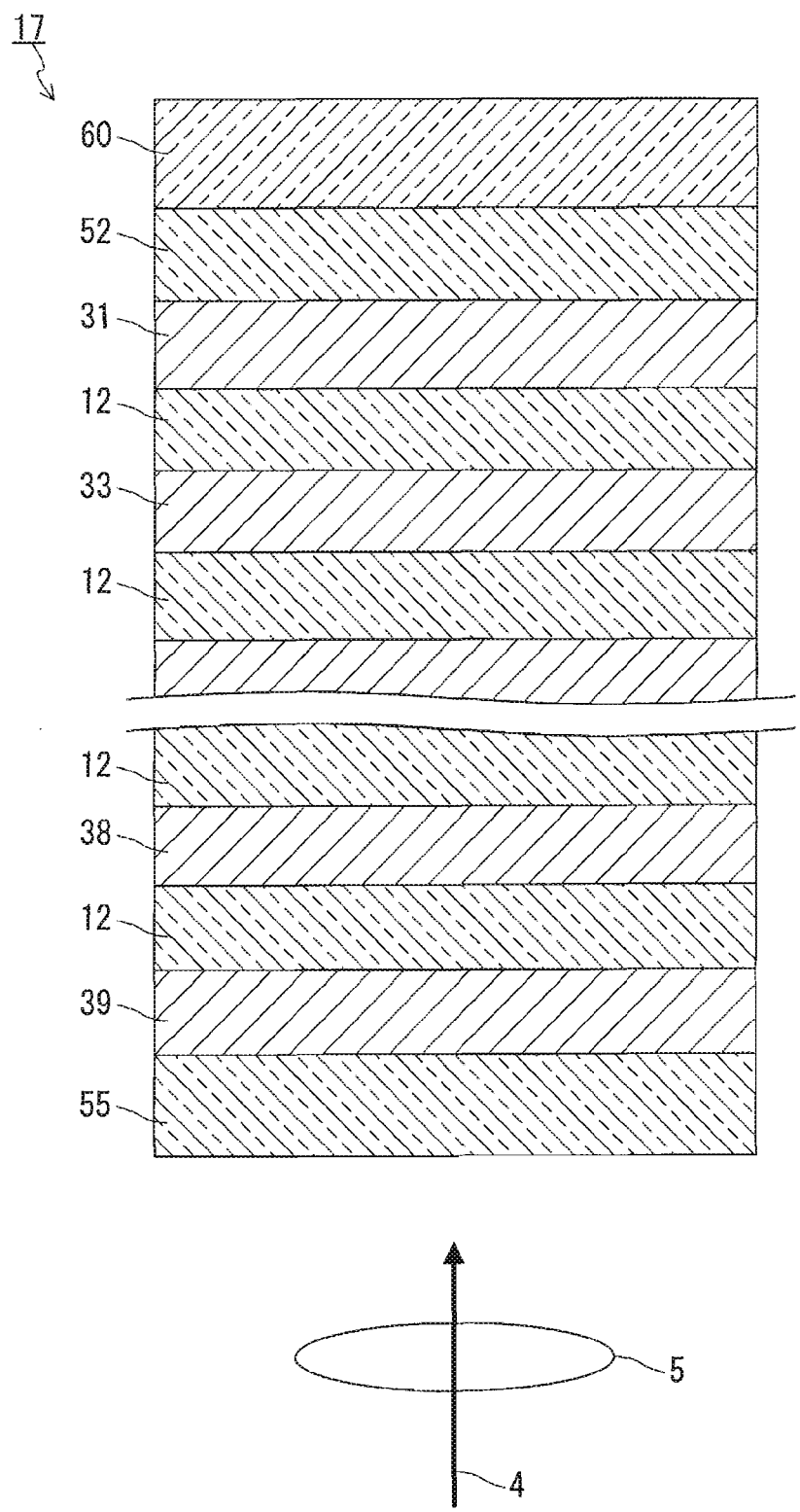
FIG. 12 is a sectional view showing still another structural example of an information recording medium of the present invention.

As in the cases of Embodiments 1 and 2, the information recording medium of this embodiment may be an information recording medium 16 including four information layers as shown in FIG. 11 or may be an information recording medium 17 including N information layers as shown in FIG. 12. For example, in the information recording medium including four information layers, two of the four information layers can be reproduction-only information layers, and the other two can be information layers each of which includes a recording layer capable of undergoing a phase change, a reflective layer, and a transmittance adjusting layer. Furthermore, the recording layer may be one that undergoes a reversible phase change or may be one that undergoes an irreversible phase change.

Embodiment 4

In Embodiment 4, an example of the methods of recording and reproducing information with respect to the information recording media described in Embodiments 1, 2, and 3 is described.

Figure 13:
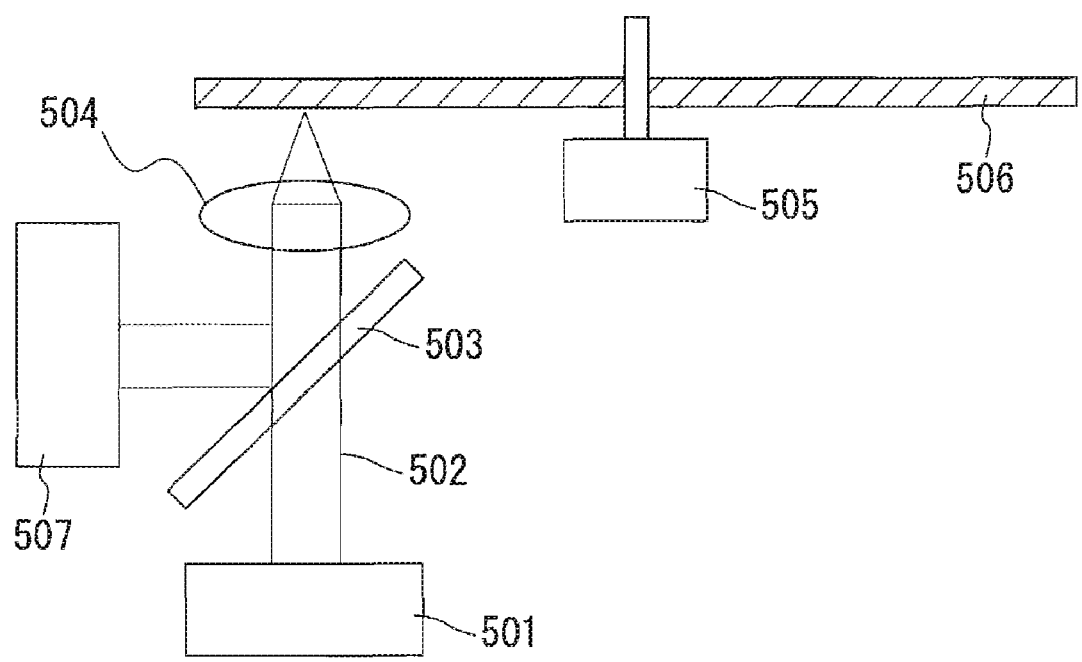
FIG. 13 is a schematic view showing an example of a recording/reproducing apparatus that can be used for recording and reproducing information with respect to an information recording medium of the present invention.

FIG. 13 shows a schematic view of an example of the recording/reproducing apparatus for recording and reproducing information with respect to an information recording medium of the present invention. This recording/reproducing apparatus includes a motor 505 for rotating an information recording medium 506, a laser diode 501, a half mirror 503, an objective lens 504, and a photodetector 507. A laser beam 502 emitted from the laser diode 501 passes through the half mirror 503 and the objective lens 504 to be focused on the information layer of the information recording medium 506 that is being rotated by the motor 505. Information is reproduced by allowing light reflected from the information recording medium 506 to enter the photodetector 507 and thereby detecting a signal. The information recording medium 506 is a medium having any one of structures described in Embodiments 1 to 3.

Figure 14:
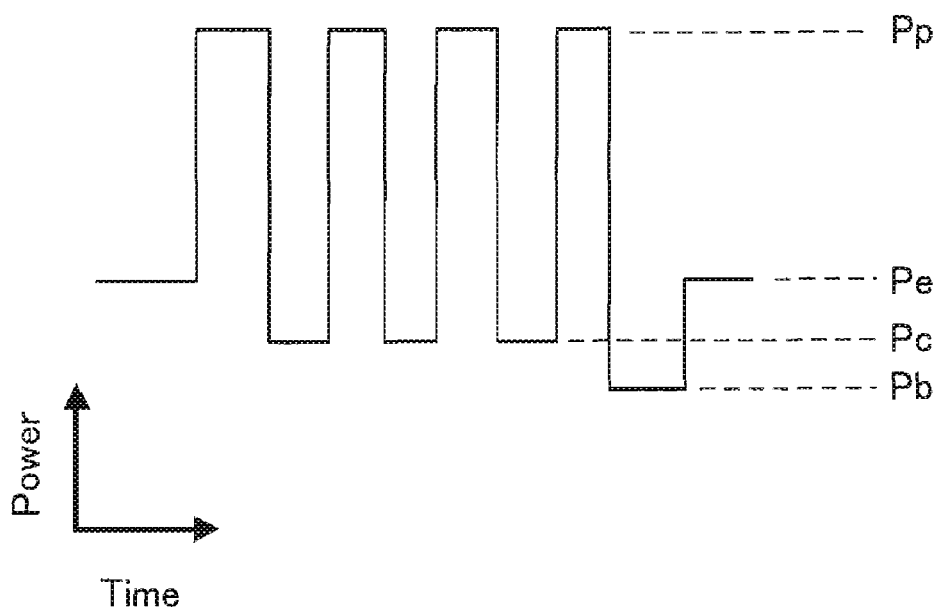
FIG. 14 is a schematic view showing an example of a recording pulse waveform that is used for recording and reproducing information with respect to an information recording medium of the present invention.

When information is to be recorded, the intensity of the laser beam 502 is modulated between a plurality of power levels. For example, a current modulation means for modulating a driving current of the laser diode 501 can be used as a means for modulating the intensity of the laser beam 502. A single rectangular pulse with a peak power Pp may be applied to the portion forming a recording mark. Particularly, in the case of forming a long mark, however, it is advantageous to use a recording pulse train composed of a plurality of pulse trains modulated between the peak power Pp and bottom power Pb (where Pp>Pb) as shown in FIG. 14 for the purpose of eliminating excess heat to uniform the mark width. Furthermore, a cooling interval with a cooling power Pc may be provided after a tail-end pulse. The portions where no marks are to be formed are kept constant at a bias power Pe (where Pp>Pe).

EXAMPLES

Hereinafter, the present invention is described in further detail using examples.

Example 1

In Example 1, with respect to sputtering targets composed of $Nb_2O_5$ or $TiO_2$, the deposition efficiency and stability thereof are examined. Table 1 indicates deposition rates obtained when sputtering was carried out using sputtering targets with a diameter of 200 mm composed of $Nb_2O_5$ or $TiO_2$, with the deposition rates obtained in the cases of presence and absence of a substrate annealing step being indicated separately.

TABLE 1

| Sample No. | Composition of sputtering target | Annealing of polycarbonate substrate | Deposition rate (nm/sec) | Deposition rate stability |
|---|---|---|---|---|
| 1-1 | $Nb_2O_5$ | Yes | 6 | ○ |
| 1-2 | $Nb_2O_5$ | None | 6 | |
| 1-3 | $TiO_2$ | Yes | 2 | X |
| 1-4 | $TiO_2$ | None | 1 | |

The deposition rate was measured as follows. First, a polycarbonate substrate with a glass chip attached thereto was prepared, and the substrate annealing step was carried out as required. Subsequently, this polycarbonate substrate was placed in a sputtering apparatus, and a sputtered film was deposited on the side where the glass chip had been attached of the polycarbonate substrate by a DC sputtering method. Conditions for the DC sputtering included an input power of 2.5 kW and an atmosphere with 0.5 Pa of mixed gas of Ar and oxygen (with an oxygen concentration of 3%). The glass chip was then removed from the polycarbonate substrate and the sputtered film on the glass chip was scraped off with a knife. Thus, a difference in level corresponding to the thickness of the sputtered film was created. This difference in level was then measured with a profiler and thereby the film thickness was measured. The deposition rate was calculated from the relationship between the film thickness of the sputtered film and the deposition time.

When the substrate annealing step was to be carried out, the polycarbonate substrate was kept in a furnace at 80° C. under a dry condition for ten hours and thereby moisture that had been adsorbed by the polycarbonate substrate was removed, and sputtering then was carried out. When the substrate annealing step was not carried out, after the polycarbonate substrate was placed in the air inside the laboratory at normal temperature for ten hours, and then sputtering was carried out.

It was confirmed that since the sputtering target composed of $Nb_2O_5$ had a high deposition rate and the deposition rate did not vary depending on the presence or absence of the annealing step, sputtering was carried out efficiently and stably (Samples 1-1 and 1-2). On the other hand, the sputtering target composed of $TiO_2$ had a lower deposition rate as compared to $Nb_2O_5$. The deposition rate varied considerably depending on the presence or absence of the annealing step (Samples 1-3 and 1-4). Specifically, the deposition rate was 2 nm/sec when the annealing step was carried out, while the deposition rate was 1 nm/sec when the annealing step was not carried out. Thus, it was proved that the sputtering target composed of $TiO_2$ had lower efficiency and instability in sputtering. In this example, the deposition rate stability was judged as "○" or "x", where "○" denotes that the deposition rate did not change and "x" denotes that it changed depending on the presence or absence of annealing of the polycarbonate substrate.

Example 2

In Example 2, with respect to an information recording medium with the same structure as that of the information recording medium 2 shown in FIG. 2, erosion caused under high temperature/high humidity conditions was examined.

The information recording medium used in this example was manufactured as follows. First, a polycarbonate substrate (with a diameter of 120 mm and a thickness of 1.1 mm) in which a guide groove for guiding a laser beam had been formed was prepared as a substrate 1. Thereafter, a Ag—Pd—Cu layer (with a thickness of 80 nm) was deposited as a reflective layer 112 on the polycarbonate substrate in a 0.5 Pa Ar gas atmosphere at 0.2 kW of input power by the DC sputtering method. Before deposition of the reflective layer 112, the substrate annealing step was carried out for ten hours.

Subsequently, a $ZrO_2$—$SiO_2$—$In_2O_3$ layer (with a thickness of 21 nm) was deposited as a first dielectric layer 113 in a 0.5 Pa Ar gas atmosphere at 2 kW of input power by the RF sputtering method. Thereafter, a $Ge_{40}Sn_5Bi_4Te_{51}$ layer (with a thickness of 11 nm) was deposited as a recording layer 115 in a 0.5 Pa Ar gas atmosphere at 0.2 kW of input power by the DC sputtering method. In the case of sputtering of the recording layer 115, with consideration given to the difference in sputtering rate among the respective atoms, a Ge—Sn—Bi—Te sputtering target with a diameter of 200 mm was used that had been adjusted so that the target composition was obtained in the deposited state (hereinafter, the same applied to all the examples). Subsequently, a $ZrO_2$—$SiO_2$—$Cr_2O_3$ layer (with a thickness of 5 nm) was deposited as a second interface layer 116 in a 0.5 Pa Ar gas atmosphere at 2 kW of input power by the RF sputtering method. Thereafter, a ZnS—SiO layer (with a thickness of 48 nm) was deposited as a second dielectric layer 117 in a 0.5 Pa Ar gas atmosphere at 5 kW of input power by the RF sputtering method. Thus, a first information layer 11 was formed.

Thereafter, ultraviolet curable resin was applied onto the first information layer 11, which was subjected to spin coating. This then was irradiated with ultraviolet light and thereby the resin was cured. Thus, a separation layer 12 (with a thickness of 25 μm) was formed.

Furthermore, a transmittance adjusting layer 131 (with a thickness of 22 nm) was deposited on the separation layer 12 in an atmosphere with 0.5 Pa of mixed gas of Ar and oxygen (with an oxygen concentration of 3%) at 2 kW of input power by the DC sputtering method. The transmittance adjusting layer 131 was deposited using a sputtering target with a diameter of 200 mm that was $Nb_2O_5$, $TiO_2$ or a mixture of $TiO_2$ and $Nb_2O_5$, and that had a composition represented by $(Nb_2O_5)_z(TiO_2)_{100-z}$ (mol %) (where z=0, 2, 5, 10, 20, 30, 40, 50, 60, 70, 80, 90, 95, 98, or 100). Before deposition of the transmittance adjusting layer 131, the substrate annealing step was carried out for ten hours.

Subsequently, a Ag—Pd—Cu layer (with a thickness of 10 nm) was deposited as a reflective layer 132 in a 0.5 Pa Ar gas atmosphere at 0.2 kW of input power by the DC sputtering method. Thereafter, a $ZrO_2$—$SiO_2$—$In_2O_3$ layer (with a thickness of 12 nm) was deposited as a first dielectric layer 133 in a 0.5 Pa Ar gas atmosphere at 2 kW of input power by the RF sputtering method. A $Ge_{40}Sn_5Bi_4Te_{51}$ layer (with a thickness of 7 nm) was then deposited as a recording layer 135 in a 0.5 Pa Ar gas atmosphere at 0.2 kW of input power by the DC sputtering method. In the case of sputtering of the recording layer 135, with consideration given to the difference in sputtering rate among the respective atoms as in the case of the first information layer 11, a Ge—Sn—Bi—Te sputtering target with a diameter of 200 mm was used that had been adjusted so that the target composition was obtained in the deposited state. Subsequently, a $ZrO_2$—$SiO_2$—$Cr_2O_3$ layer (with a thickness of 5 nm) was deposited as a second interface layer 136 in a 0.5 Pa Ar gas atmosphere at 2 kW of input power by the RF sputtering method. Thereafter, a ZnS—$SiO_2$ layer (with a thickness of 37 nm) was deposited as a second dielectric layer 137 in a 0.5 Pa Ar gas atmosphere at 5 kW of input power by the RF sputtering method. Thus, a second information layer 13 was formed.

Finally, ultraviolet curable resin was applied onto the second information layer 13, which was subjected to spin coating. This then was irradiated with ultraviolet light and thereby the resin was cured. Thus, a transparent layer 3 (with a thickness of 75 μm) was formed.

In the manner as described above, 15 types of samples with the same film structure as that of the information recording medium 2 were produced (Samples 2-1 to 2-15). With respect to each of the samples, a laser beam was allowed to be incident from the transparent layer 3 side and thereby the whole surfaces of the recording layers were initialized.

The samples thus produced were placed in a furnace with a temperature of 90° C. and a humidity of 80% for 200 hours. Thereafter, erosion in the vicinity of the transmittance adjusting layer was checked. In this case, the erosion was checked by using an optical microscope to magnify the surface of the information recording medium 200 times and thereby observing it. The results are indicated in Table 2.

TABLE 2

| Sample No. | Composition of sputtering target (mol %) $(Nb_2O_5)z(TiO_2)_{100-z}$ z | Composition of sputtering target (atom %) $Nb_xTa_yO_{100-x-y}$ | | Moisture resistance |
|---|---|---|---|---|
| | | x | y | |
| 2-1 | 0 | 0.0 | 33.3 | ○ |
| 2-2 | 2 | 1.3 | 31.8 | ○ |
| 2-3 | 5 | 3.1 | 29.7 | ○ |
| 2-4 | 10 | 5.9 | 26.5 | ○ |
| 2-5 | 20 | 10.5 | 21.1 | ○ |
| 2-6 | 30 | 14.3 | 16.7 | ○ |
| 2-7 | 40 | 17.3 | 13.0 | ○ |
| 2-8 | 50 | 20.0 | 10.0 | ○ |
| 2-9 | 60 | 22.2 | 7.4 | ○ |
| 2-10 | 70 | 24.1 | 5.2 | ○ |
| 2-11 | 80 | 25.8 | 3.2 | ○ |
| 2-12 | 90 | 27.3 | 1.5 | ○ |
| 2-13 | 95 | 27.9 | 0.7 | ○ |
| 2-14 | 98 | 28.3 | 0.3 | ○ |
| 2-15 | 100 | 28.6 | 0.0 | X |

Erosion was observed in the information recording medium (Sample 2-15) with the transmittance adjusting layer formed of $Nb_2O_5$ alone. In the information recording media (Samples 2-1 to 2-14) with the transmittance adjusting layers containing $TiO_2$, the occurrence of erosion that made them difficult to use was not observed. Furthermore, it also was proved that erosion was eliminated more reliably when the content of $Nb_2O_5$ was 90 mol % or less (Samples 2-1 to 2-12). The moisture resistance was judged as "x" or "○", where "x" denotes the case where erosion or peeling that made it difficult to use as information recording medium was observed with an optical microscope and "○" denotes the case where it was not observed.

Example 3

In Example 3, with respect to information recording media with the same structure as that of the information recording medium 2 shown in FIG. 2, erosion under high temperature/high humidity conditions was examined as in Example 2. The method of manufacturing the information recording media is the same as that employed in Example 2. In Example 3, however, the transmittance adjusting layer 131 was deposited using a sputtering target with a diameter of 200 mm that was $Bi_2O_3$, $Nb_2O_5$ or a mixture of $Bi_2O_3$ and $Nb_2O_5$, and had a composition represented by $(Nb_2O_5)_z(Bi_2O_3)_{100-z}$ (mol %) (where z=0, 2, 5, 10, 20, 30, 40, 50, 60, 70, 80, 90, 95, 98, or 100).

The samples thus produced were placed in a furnace with a temperature of 90° C. and a humidity of 80% for 200 hours. Thereafter, an optical microscope was used to magnify the surfaces of the information recording media 200 times and thereby erosion was observed. The results are indicated in Table 3.

TABLE 3

| Sample No. | Composition of sputtering target (mol %) $(Nb_2O_5)z(Bi_2O_3)_{100-z}$ z | Composition of sputtering target (atom %) $Nb_xBi_yO_{100-x-y}$ | | Moisture resistance |
|---|---|---|---|---|
| | | x | y | |
| 3-1 | 0 | 0.0 | 40.0 | ○ |
| 3-2 | 2 | 0.8 | 38.9 | ○ |
| 3-3 | 5 | 2.0 | 37.3 | ○ |
| 3-4 | 10 | 3.8 | 34.6 | ○ |
| 3-5 | 20 | 7.4 | 29.6 | ○ |
| 3-6 | 30 | 10.7 | 25.0 | ○ |
| 3-7 | 40 | 13.8 | 20.7 | ○ |
| 3-8 | 50 | 16.7 | 16.7 | ○ |
| 3-9 | 60 | 19.4 | 12.9 | ○ |
| 3-10 | 70 | 21.9 | 9.4 | ○ |
| 3-11 | 80 | 24.2 | 6.1 | ○ |
| 3-12 | 90 | 26.5 | 2.9 | ○ |
| 3-13 | 95 | 27.5 | 1.4 | ○ |
| 3-14 | 98 | 28.2 | 0.6 | ○ |
| 3-15 | 100 | 28.6 | 0.0 | X |

The criteria for judging the moisture resistance are the same as in Example 2. According to these results, it was proved that erosion was prevented from occurring when $Bi_2O_3$ or a mixture of $Bi_2O_3$ and $Nb_2O_5$ was used as the material for the transmittance adjusting layer (Sample Nos. 3-1 to 3-14). Furthermore, as in the results of Example 2, it also was proved that erosion was eliminated more reliably when the content of $Nb_2O_5$ was 90 mol % or less (Samples 3-1 to 3-12).

Example 4

In Example 4, deposition efficiency and stability were examined with respect to each material used for depositing the transmittance adjusting layer of the information recording medium of the present invention by sputtering. In Example 4, the deposition rates of sputtering targets with a diameter 200 mm were examined. The sputtering targets each were formed of a mixture of $Nb_2O_5$ and oxide of element M (oxide of Ti, Zr, Hf, Y, Cr, Zn, Ga, Co, Bi, In, Ta, or Ce (M-O)) (that had a mole ratio of 50%:50% in all the cases and were represented by $(Nb_2O_5)_{50}(M-O)_{50}$). The method of measuring the deposition rate was the same as in Example 1.

Table 4 indicates deposition rates obtained when the respective sputtering targets described above were sputtered as the transmittance adjusting layers.

TABLE 4

| Sample No. | Composition of sputtering target (mol %) $(Nb_2O_5)_{50}(M-O)_{50}$ | Annealing of polycarbonate substrate | Deposition rate (nm/sec) | Deposition rate stability |
|---|---|---|---|---|
| 4-1 | $(Nb_2O_5)_{50}(TiO_2)_{50}$ | Yes | 4 | ○ |
| 4-2 | | None | 4 | |
| 4-3 | $(Nb_2O_5)_{50}(ZrO_2)_{50}$ | Yes | 4 | ○ |
| 4-4 | | None | 4 | |
| 4-5 | $(Nb_2O_5)_{50}(HfO_2)_{50}$ | Yes | 4 | ○ |
| 4-6 | | None | 4 | |
| 4-7 | $(Nb_2O_5)_{50}(Y_2O_3)_{50}$ | Yes | 3 | ○ |
| 4-8 | | None | 3 | |
| 4-9 | $(Nb_2O_5)_{50}(Cr_2O_3)_{50}$ | Yes | 3 | ○ |
| 4-10 | | None | 3 | |
| 4-11 | $(Nb_2O_5)_{50}(ZnO)_{50}$ | Yes | 5 | ○ |
| 4-12 | | None | 5 | |
| 4-13 | $(Nb_2O_5)_{50}(Ga_2O_3)_{50}$ | Yes | 5 | ○ |
| 4-14 | | None | 5 | |
| 4-15 | $(Nb_2O_5)_{50}(CoO)_{50}$ | Yes | 2 | ○ |

TABLE 4-continued

| Sample No. | Composition of sputtering target (mol %) $(Nb_2O_5)_{50}(M-O)_{50}$ | Annealing of polycarbonate substrate | Deposition rate (nm/sec) | Deposition rate stability |
|---|---|---|---|---|
| 4-16 | | None | 2 | |
| 4-17 | $(Nb_2O_5)_{50}(Bi_2O_3)_{50}$ | Yes | 8 | ○ |
| 4-18 | | None | 8 | |
| 4-19 | $(Nb_2O_5)_{50}(In_2O_3)_{50}$ | Yes | 6 | ○ |
| 4-20 | | None | 6 | |
| 4-21 | $(Nb_2O_5)_{50}(Ta_2O_5)_{50}$ | Yes | 5 | ○ |
| 4-22 | | None | 5 | |
| 4-23 | $(Nb_2O_5)_{50}(CeO_2)_{50}$ | Yes | 2 | ○ |
| 4-24 | | None | 2 | |
| 1-3 | $TiO_2$ | Yes | 2 | X |
| 1-4 | | None | 1 | |

The deposition rates of $TiO_2$ examined in Example 1 are indicated together in Table 4 as a reference. It was proved that the deposition rates of the mixtures of $Nb_2O_5$ and oxides of Ti, Zr, Hf, Y, Cr, Zn, Ga, Co, Bi, In, Ta, and Ce were stable regardless of the presence or absence of annealing of the polycarbonate substrate. In this example, the deposition rate stability was judged as "○" or "x", where "○" denotes that the deposition rate did not change and "x" denotes that it changed depending on the presence or absence of annealing of the polycarbonate substrate.

According to these results, it was proved that from the viewpoint of the deposition rate, the element M was preferably at least one element selected from Ti, Zr, Hf, Y, Cr, Zn, Ga, Bi, In, and Ta, more preferably at least one element selected from Ti, Zr, Hf, Zn, Ga, Bi, In, and Ta, further preferably at least one element selected from Zn, Ga, Bi, In, and Ta, and still further preferably at least one element selected from Bi and In.

Example 5

In Example 5, deposition efficiency and stability were examined with respect to each material used for depositing a transmittance adjusting layer of an information recording medium of the present invention by sputtering. In Example 5, the deposition rates of sputtering targets with a diameter of 200 mm were examined. The sputtering targets each were formed of $Ta_2O_5$, $Nb_2O_5$ or a mixture of $Ta_2O_5$ and $Nb_2O_5$, and had a composition represented by $(Nb_2O_5)_z(Ta_2O_5)_{100-z}$ (mol %) (where z=0, 10, 20, 30, 40, 50, 60, 70, 80, 90, or 100). The method of measuring the deposition rate was the same as in Example 1.

Table 5-A indicates the deposition rates obtained when the respective sputtering targets described above were sputtered as the transmittance adjusting layers.

TABLE 5-A

| Sample No. | Composition of sputtering target (mol %) $(Nb_2O_5)_Z(Ta_2O_5)_{100-z}$ z | Composition of sputtering target (atom %) $Nb_xTa_yO_{100-x-y}$ | | Annealing of polycarbonate substrate | Deposition rate (nm/sec) | Deposition rate stability |
|---|---|---|---|---|---|---|
| | | x | y | | | |
| 5A-1 | 0 | 0 | 28.6 | Yes | 2 | X |
| 5A-2 | | | | None | 1 | |
| 5A-3 | 10 | 2.9 | 25.7 | Yes | 3 | Δ |
| 5A-4 | | | | None | 2 | |
| 5A-5 | 20 | 5.7 | 22.9 | Yes | 4 | Δ |
| 5A-6 | | | | None | 3 | |
| 5A-7 | 30 | 8.6 | 20 | Yes | 4 | ○ |
| 5A-8 | | | | None | 4 | |
| 5A-9 | 40 | 11.4 | 17.1 | Yes | 4 | ○ |
| 5A-10 | | | | None | 4 | |
| 5A-11 | 50 | 14.3 | 14.3 | Yes | 5 | ○ |
| 5A-12 | | | | None | 5 | |
| 5A-13 | 60 | 17.1 | 11.4 | Yes | 5 | ○ |
| 5A-14 | | | | None | 5 | |
| 5A-15 | 70 | 20 | 8.6 | Yes | 5 | ○ |
| 5A-16 | | | | None | 5 | |
| 5A-17 | 80 | 22.9 | 5.7 | Yes | 6 | ○ |
| 5A-18 | | | | None | 6 | |
| 5A-19 | 90 | 25.7 | 2.9 | Yes | 6 | ○ |
| 5A-20 | | | | None | 6 | |
| 5A-21 | 100 | 28.6 | 0 | Yes | 6 | ○ |
| 5A-22 | | | | None | 6 | |

It was proved that the materials containing at least 2.9 atom % of Nb (at least 10 mol % in terms of oxide of Nb ($Nb_2O_5$)) allowed higher deposition rates to be obtained as compared to the materials formed of $Ta_2O_5$ alone (Samples 5A-1 and 5A-2). Furthermore, it was proved that with an increase in content of Nb, the difference in deposition rate caused depending on the presence or absence of annealing of the polycarbonate substrate was reduced, i.e. the deposition rate ratio ((deposition rate obtained with no annealing)/(deposition rate obtained with annealing)) approached 1. Furthermore, it also was proved that when at least 8.6 atom % of Nb (at least 30 mol % in terms of oxide of Nb ($Nb_2O_5$)) was contained, the deposition rate further increased and the variations in deposition rate caused depending on the presence or absence of annealing of the polycarbonate substrate sufficiently were prevented from occurring (i.e. the deposition rate was stabilized). The deposition rate stability was judged as "○", "Δ", or "x", where "○" denotes that the deposition rate did not change depending on the presence or absence of annealing of the polycarbonate substrate, "Δ" denotes that the deposition rate ratio exceeded 0.5, and "x" denotes that the deposition rate ratio was 0.5 or lower.

Similarly with respect to the case where Ti was used as the element M, the deposition efficiency and stability were examined in the same manner, and the results indicated in Table 5-B were obtained. From the results, it was proved that Ti allowed the similar effect to that obtained in the case of Ta to be obtained.

TABLE 5-B

| Sample No. | Composition of sputtering target (mol %) $(Nb_2O_5)_z(TiO_2)_{100-z}$ z | Composition of sputtering target (atom %) $Nb_xTi_yO_{100-x-y}$ | | Annealing of polycarbonate substrate | Deposition rate (nm/sec) | Deposition rate stability |
|---|---|---|---|---|---|---|
| | | x | y | | | |
| 5B-1 | 0 | 0 | 33.3 | Yes | 2 | X |
| 5B-2 | | | | None | 1 | |
| 5B-3 | 4.5 | 2.8 | 30.0 | Yes | 3 | Δ |
| 5B-4 | | | | None | 2 | |
| 5B-5 | 10 | 5.9 | 26.5 | Yes | 3 | Δ |
| 5B-6 | | | | None | 2 | |
| 5B-7 | 20 | 10.5 | 21.1 | Yes | 4 | Δ |
| 5B-8 | | | | None | 3 | |
| 5B-9 | 30 | 14.3 | 16.7 | Yes | 4 | ○ |
| 5B-10 | | | | None | 4 | |
| 5B-11 | 40 | 17.3 | 13 | Yes | 4 | ○ |
| 5B-12 | | | | None | 4 | |
| 5B-13 | 50 | 20 | 10 | Yes | 4 | ○ |
| 5B-14 | | | | None | 4 | |
| 5B-15 | 60 | 22.2 | 7.4 | Yes | 5 | ○ |
| 5B-16 | | | | None | 5 | |
| 5B-17 | 70 | 24.1 | 5.2 | Yes | 5 | ○ |
| 5B-18 | | | | None | 5 | |
| 5B-19 | 80 | 25.8 | 3.2 | Yes | 5 | ○ |
| 5B-20 | | | | None | 5 | |
| 5B-21 | 90 | 27.3 | 1.5 | Yes | 6 | ○ |
| 5B-22 | | | | None | 6 | |
| 5B-23 | 100 | 28.6 | 0 | Yes | 6 | ○ |
| 5B-24 | | | | None | 6 | |

Example 6

In Example 6, deposition efficiency and stability were examined with respect to each material used for depositing the transmittance adjusting layer of the information recording medium of the present invention by sputtering. In Example 6, the deposition rates of sputtering targets with a diameter 200 mm were examined. The sputtering targets each were formed of a mixture of $Nb_2O_5$ and $TiO_2$ or a mixture of $Nb_2O_5$, $TiO_2$, and $LaF_3$ and had a composition represented by $[(Nb_2O_5)_{80}(TiO_2)_{20}]_{100-a}(LaF_3)_a$ (mol %) (where a=0, 5, 10, 15, or 20). The method of measuring the deposition rate was the same as in Example 1.

Table 6 indicates the deposition rates and deposition rate stability obtained when the respective sputtering targets described above were sputtered. The evaluation of the deposition rate stability is the same as in Example 5.

TABLE 6

| Sample No. | Composition of sputtering target (mol %) $[(Nb_2O_5)_{80}(TiO_2)_{20}]_{100-a}(LaF_3)_a$ a | Annealing of polycarbonate substrate | Deposition rate (nm/sec) | Deposition rate stability |
|---|---|---|---|---|
| 6-1 | 0 | Yes | 6 | ○ |
| 6-2 | | None | 6 | |
| 6-3 | 5 | Yes | 6 | ○ |
| 6-4 | | None | 6 | |
| 6-5 | 10 | Yes | 6 | ○ |
| 6-6 | | None | 6 | |
| 6-7 | 15 | Yes | 6 | Δ |
| 6-8 | | None | 5 | |
| 6-9 | 20 | Yes | 5 | Δ |
| 6-10 | | None | 4 | |

It was proved that when a≦10 in a composition represented by $[(Nb_2O_5)_{80}(TiO_2)_{20}]_{100-a}(LaF_3)_a$ (mol %), the deposition rate was stable depending on the presence or absence of annealing of the polycarbonate substrate (Samples 6-1 to 6-6).

Example 7

In Example 7, samples were produced including only the second information layer 13 and the transparent layer 3 formed on the substrate 1 without having the first information layer 11 and the separation layer 12 of the information recording medium 2 shown in FIG. 2, and the relationships between the refractive index $n_t$, extinction coefficient $k_t$, and thickness d of the transmittance adjusting layer 131 and the transmittances Tc and Ta of the second information layer 13 were checked.

The samples were produced as follows. First, a polycarbonate substrate 1 (with a diameter of 120 mm and a thickness of 1.1 mm) in which a guide groove for guiding a laser beam had been formed was prepared as the substrate 1.

Thereafter, a transmittance adjusting layer 131 was deposited on the polycarbonate substrate in an atmosphere with 0.5 Pa of mixed gas of Ar and oxygen (with an oxygen concentration of 3%) at 2 kW of input power by the DC sputtering method. In this case, before deposition of the transmittance adjusting layer 131, the substrate annealing step was carried out for ten hours. The composition of each transmittance adjusting layer thus produced is indicated in Table 7.

Subsequently, a Ag—Pd—Cu layer (with a thickness of 10 nm) was deposited as the reflective layer 132 in a 0.5 Pa Ar gas atmosphere at 0.2 kW of input power by the DC sputtering method. A $ZrO_2$—$SiO_2$—$In_2O_3$ layer (with a thickness of 12 nm) was deposited as the first dielectric layer 133 in a 0.5 Pa Ar gas atmosphere at 2 kW of input power by the RF sputtering method. A $Ge_{40}Sn_5Bi_4Te_{51}$ layer (with a thickness of 7 nm) was deposited as the recording layer 135 in a 0.5 Pa Ar gas atmosphere at 0.2 kW of input power by the DC sputtering method. A $ZrO_2$—$SiO_2$—$Cr_2O_3$ layer (with a thickness of 5 nm) was deposited as the second interface layer 136 in a 0.5 Pa Ar gas atmosphere at 0.2 kW of input power by the RF sputtering method. A ZnS—$SiO_2$ layer (with a thickness of 37 nm) was deposited as the second dielectric layer 137 in a 0.5 Pa Ar gas atmosphere at 2 kW of input power by the RF sputtering method. Thus, the second information layer 13 was formed.

Finally, ultraviolet curable resin was applied onto the second information layer 13, which was subjected to spin coating. Thereafter, this was irradiated with ultraviolet light and thereby the resin was cured. Thus, the transparent layer 3 (with a thickness of 100 μm) was formed.

Thus, six types of samples were produced.

These samples each were irradiated with a laser beam from the transparent layer 3 side and part of the recording layer was initialized.

Each sample was subjected to measurement of the transmittance Ta obtained when the recording layer 135 was in an amorphous phase and the transmittance Tc obtained when the recording layer was in a crystalline phase. A spectroscope was used for the measurement of the transmittances, and the transmittances at a wavelength of 405 nm were checked.

Table 7 indicates the relationships between the refractive index $n_t$ and extinction coefficient $k_t$ of the transmittance adjusting layer 131 and the transmittances Tc and Ta of the second information layer 13.

TABLE 7

| Sample No. | Composition of sputtering target | $n_t$ | $k_t$ | Tc (%) | Ta (%) | Transmittance Judgment |
|---|---|---|---|---|---|---|
| 7-1 | $Ta_2O_5$ | 2.35 | 0.03 | 43 | 44 | Δ |
| 7-2 | $(Nb_2O_5)_{50}(Ta_2O_5)_{50}$ | 2.41 | 0.04 | 45 | 46 | ○ |
| 7-3 | $Nb_2O_5$ | 2.52 | 0.05 | 47 | 48 | ○ |
| 7-4 | $(Nb_2O_5)_{50}(TiO_2)_{50}$ | 2.62 | 0.03 | 48 | 50 | ○ |
| 7-5 | $TiO_2$ | 2.70 | 0.02 | 49 | 51 | ○ |
| 7-6 | $(Nb_2O_5)_{50}(Bi_2O_3)_{50}$ | 2.80 | 0.02 | 52 | 53 | ○ |

In the samples indicated in Table 7, the film thickness of each transmittance adjusting layer 131 was 22 nm, and the material used was a sputtering target with a diameter of 200 mm of $Nb_2O_5$, $Ta_2O_5$, $TiO_2$, $(Nb_2O_5)_{50}(Ta_2O_5)_{50}$ (mol %), $(Nb_2O_5)_{50}(TiO_2)_{50}$ (mol %), or $(Nb_2O_5)_{50}(Bi_2O_3)_{50}$ (mol %). The refractive index and the extinction coefficient were measured using an ellipsometer.

In the case of the structure of the information recording medium 2, it is preferable that both the transmittance Ta and the transmittance Tc of the second information layer 13 be at least 45%, and it has been known that the transmittances increase with an increase in refractive index of the transmittance adjusting layer 131. From Table 7, it was proved that in the case of the samples produced in this example, the refractive index $n_t$ of the transmittance adjusting layer 131 was preferably at least 2.4. Both the transmittances Ta and Tc were judged as "○", "Δ", or "x", where "○" denotes that the both were at least 45%, "Δ" denotes that one of them was at least 35% but lower than 45%, and "x" denotes that one of them was lower than 35%.

Furthermore, the relationship between the film thickness d of the transmittance adjusting layer 131 and the transmittances Tc and Ta also was checked. The results are indicated in Table 8. The criteria for judging the transmittances were the same as in Table 7.

TABLE 8

| Sample No. | Composition of sputtering target | d | d (nm) | Tc (%) | Ta (%) | Transmittance Judgment |
|---|---|---|---|---|---|---|
| 8-1 | $(Nb_2O_5)_{50}(Bi_2O_3)_{50}$ | $\lambda/64n_t$ | 2 | 43 | 43 | Δ |
| 8-2 | $n_t = 2.8$ | $\lambda/32n_t$ | 5 | 46 | 47 | ○ |
| 8-3 | | $\lambda/16n_t$ | 9 | 50 | 51 | ○ |
| 8-4 | | $\lambda/8n_t$ | 18 | 54 | 56 | ○ |
| 8-5 | | $\lambda/4n_t$ | 36 | 45 | 47 | ○ |
| 8-6 | | $\lambda/3.5n_t$ | 42 | 43 | 44 | Δ |

With respect to the samples indicated in Table 8, using a sputtering target with a diameter of 200 mm of $(Nb_2O_5)_{50}(Bi_2O_3)_{50}$ (mol %) as the material for the transmittance adjusting layer 131, transmittance adjusting layers whose film thicknesses were 2 nm, 5 nm, 9 nm, 18 nm, 36 nm, and 42 nm were deposited. From Table 8, when the film thickness d of the transmittance adjusting layer 131 was in the range of $\lambda/32n_t$ to $\lambda/4n_t$ (λ is the wavelength of the laser beam, and λ=405 nm in this example) (i.e. when the film thickness d was 5 nm to 36 nm), both the transmittances Tc and Ta were at least 45%, and good results were obtained. Particularly, when the film thickness d was $\lambda/8n_t$, high transmittance was obtained.

Example 8

In Example 8, erosion caused under high temperature/high humidity conditions was checked with respect to the information recording medium 6 shown in FIG. 3. The information recording medium 6 includes four information layers.

The information recording media 6 of this example were produced as follows. First, a first information layer 21 and a separation layer 12 (with a thickness of 10 μm) were formed on a substrate 1 by the same procedure as that used in Example 2. Furthermore, a second information layer 23 was formed on the separation layer 12. The second information layer 23 produced in this example had the same film structure as that of the second information layer 13 of the information recording medium 2 shown in FIG. 2. Therefore, with the numerals indicating the respective layers being identical to those indicating the respective layers composing the second information layer 13 of the information recording medium 2, the method of forming the second information layer 23 is described below.

A transmittance adjusting layer 131 (with a thickness of 22 nm) was deposited on the separation layer 12 by sputtering.

The material for the transmittance adjusting layer 131 was TiO$_2$, Nb$_2$O$_5$ or a mixture of TiO$_2$ and Nb$_2$O$_5$, and it was deposited using a sputtering target with a diameter of 200 mm whose composition was represented by (Nb$_2$O$_5$)$_z$(TiO$_2$)$_{100-z}$ (mol %) (where z=0, 10, 20, 30, 40, 50, 60, 70, 80, 90, or 100). In this case, before deposition of the transmittance adjusting layer 131, the substrate annealing step was carried out for ten hours.

Subsequently, a Ag—Pd—Cu layer (with a thickness of 8 nm) to serve as a reflective layer 132, a ZrO$_2$—SiO$_2$—In$_2$O$_3$ layer (with a thickness of 10 nm) to serve as a first dielectric layer 133, a Ge$_{40}$Sn$_5$Bi$_4$Te$_{51}$ layer (with a thickness of 6 nm) to serve as a recording layer 135, a ZrO$_2$—SiO$_2$—Cr$_2$O$_3$ layer (with a thickness of 5 nm) to serve as a second interface layer 136, and a ZnS—SiO$_2$ layer (with a thickness of 33 nm) to serve as a second dielectric layer 137 were stacked sequentially by sputtering. Thus a second information layer 23 was formed. Thereafter, a separation layer 12 (with a thickness of 15 μm) was formed on the second information layer 23, and a third information layer 24, a separation layer 12 (with a thickness of 20 μm), and a fourth information layer 25 were formed on the separation layer 12. The third information layer 24 and the fourth information layer 25 thus produced included neither a transmittance adjusting layer nor a reflective layer and the transmittance was improved by reducing the thickness of each recording layer to 4 nm, but the film structure other than this was identical to that of the second information layer 23. Finally, ultraviolet curable resin was applied onto the fourth information layer 25, which was subjected to spin coating. Thereafter, this was irradiated with ultraviolet light and thereby the resin was cured. Thus, the transparent layer 3 (with a thickness of 55 μm) was formed.

The respective samples of this example were produced as described above.

Each sample was irradiated with a laser beam from the transparent layer 3 side, and thereby the whole surfaces of the recording layers were initialized.

The samples thus produced were placed in a furnace with a temperature of 90° C. and a humidity of 80% for 200 hours. Thereafter, the surface of each information recording medium was magnified 200 times using an optical microscope and erosion was observed. The results were equivalent to those obtained in Example 2. When the transmittance adjusting layer 131 was formed of Nb$_2$O$_5$ alone, the occurrence of erosion was observed, but it was proved that erosion was prevented from occurring by mixing TiO$_2$ with Nb$_2$O$_5$.

Example 9

In Example 9, erosion caused under high temperature/high humidity conditions was checked with respect to the information recording medium 7 shown in FIG. 4. The information recording medium 7 shown in FIG. 4 includes N information layers, but in this example, information recording media with six information layers were produced as the case of N=6.

The samples of this example were produced as follows. First, a first information layer 31 and a separation layer 12 (with a thickness of 10 μm) were formed on a substrate 1 by the same procedure as that used in Example 2. Furthermore, a second information layer 33 was formed on the separation layer 12. The second information layer 33 produced in this example had the same film structure as that of the second information layer 13 of the information recording medium 2 shown in FIG. 2. Therefore, with the numerals indicating the respective layers being identical to those indicating the respective layers composing the second information layer 13 of the information recording medium 2, the method of forming the second information layer 33 in this example is described below.

A transmittance adjusting layer 131 (with a thickness of 22 nm) was deposited on the separation layer 12 by sputtering. The material for the transmittance adjusting layer 131 was TiO$_2$, Nb$_2$O$_5$ or a mixture of TiO$_2$ and Nb$_2$O$_5$, and it was deposited using a sputtering target with a diameter of 200 mm whose composition was represented by (Nb$_2$O$_5$)$_z$(TiO$_2$)$_{100-z}$ (mol %) (where z=0, 10, 20, 30, 40, 50, 60, 70, 80, 90, or 100). In this case, before deposition of the transmittance adjusting layer 131, the substrate annealing step was carried out for ten hours.

Subsequently, a Ag—Pd—Cu layer (with a thickness of 7 nm) to serve as a reflective layer 132, a ZrO$_2$—SiO$_2$—In$_2$O$_3$ layer (with a thickness of 10 nm) to serve as a first dielectric layer 133, a Ge$_{40}$Sn$_5$Bi$_4$Te$_{51}$ layer (with a thickness of 5 nm) to serve as a recording layer 135, a ZrO$_2$—SiO$_2$—Cr$_2$O$_3$ layer (with a thickness of 5 nm) to serve as a second interface layer 136, and a ZnS—SiO$_2$ layer (with a thickness of 30 nm) to serve as a second dielectric layer 137 were stacked sequentially by sputtering. Thus the second information layer 33 was formed. Thereafter, a separation layer 12 (with a thickness of 12 μm) was formed on the second information layer 33, and a third information layer, a separation layer 12 (with a thickness of 14 μm), a fourth information layer, a separation layer 12 (with a thickness of 16 μm), a fifth information layer, a separation layer 12 (with a thickness of 18 μm), and a sixth information layer were formed on the separation layer 12. In this case, the third information layer, the fourth information layer, the fifth information layer, and the sixth information layer included neither a transmittance adjusting layer nor a reflective layer. In order to improve the transmittance, the thicknesses of the recording layers of the third information layer and the fourth information layer were reduced to 3 nm, and the thicknesses of the recording layers of the fifth information layer 38 and the sixth information layer 39 were reduced to 2 nm. However, the film structure other than this was identical to that of the second information layer 23. Finally, ultraviolet curable resin was applied onto the sixth information layer 39, which was subjected to spin coating. Thereafter, this was irradiated with ultraviolet light and thereby the resin was cured. Thus, the transparent layer 3 (with a thickness of 30 μm) was formed.

Each sample produced as described above was irradiated with a laser beam from the transparent layer 3 side, and thereby the whole surfaces of the recording layers were initialized.

The samples thus produced were placed in a furnace with a temperature of 90° C. and a humidity of 80% for 200 hours. Thereafter, the surface of each information recording medium was magnified 200 times using an optical microscope and erosion was observed. The results were equivalent to those obtained in Example 2. When the transmittance adjusting layer 131 was formed of Nb$_2$O$_5$ alone, the occurrence of erosion was observed, but it was proved that erosion was prevented from occurring by mixing TiO$_2$ with Nb$_2$O$_5$.

Example 10

In Example 10, information recording media with the same structure as that of the information recording medium 2 shown in FIG. 2 were produced, and the relationship between the transmission efficiency of the second information layer 13 and the period of time for which the annealing step was carried out before deposition of the transmittance adjusting layer 131 of the second information layer 13 was checked.

Specifically, an information recording medium with the transmittance adjusting layer 131 whose composition was $TiO_2$ and an information recording medium with the transmittance adjusting layer 131 whose composition was $(Nb_2O_5)_{50}(Bi_2O_3)_{50}$ (mol %) each were produced with and without the annealing step carried out before deposition of the transmittance adjusting layer 131. With respect to all the information recording media, the transmission efficiency of the second information layer 13 was checked. The period of time for which the annealing step was carried out was two hours, five hours, ten hours, or 24 hours. The transmission efficiency of the second information layer 13 was checked by examining the reflectance and recording sensitivity of the first information layer 11. This is because the reflectance and the recording sensitivity of the first information layer vary depending on the transmission efficiency of the second information layer 13 since recording and reproduction with respect to the first information layer 11 are carried out with a laser beam that has passed through the second information layer 13.

The method of manufacturing the information recording media in this example is the same as that used in Example 2. The deposition rate employed for sputtering of the transmittance adjusting layer 131 of the second information layer 13 was the rate obtained when the annealing step was carried out for ten hours.

The transmission efficiency of the second information layer 13 was measured using a recording/reproducing apparatus shown in FIG. 13. The wavelength of the laser beam 502 was 405 nm, the numerical aperture of the objective lens 504 was 0.85, the linear velocity of the information recording medium 506 during measurement was 4.9 m/s, and the shortest mark length (2T) was 0.149 µm.

The reflectance was checked by focusing the laser beam 502 on the first information layer 11 through the objective lens 504, allowing the light reflected from the first information layer 11 to enter the photodetector 507, and thereby measuring the signal intensity. The reflectance checked herein was one obtained when the recording layer 115 was in a crystalline phase.

The recording sensitivity was evaluated by recording random signals with mark lengths from 0.149 µm (2T) to 0.596 µm (8T), with the laser beam power being modulated between 0 and Pp (mW) as shown in FIG. 14, and measuring front-end jitter (the error in marked position at the recording mark front end) and rear-end jitter (the error in marked position at the recording mark rear end) of each recording mark with a time interval analyzer. The smaller the jitter value, the better the recording performance. Pp, Pe, Pc, and Pb were determined so that the average jitter (the average value of front-end jitter and rear-end jitter) was smallest, and the optimum Pp obtained at this time was considered as recording sensitivity.

Table 9 indicates recording sensitivity (Pp) and reflectance Rc of the first information layer 11 and reflectance Rc and transmittance Tc of the second information layer 13 with respect to each information recording medium produced herein.

TABLE 9

| Sample No. | Composition of transmittance adjusting layer | Annealing time before deposition [hr] | First information layer | | Second information layer | | Performance stability |
|---|---|---|---|---|---|---|---|
| | | | Pp [mW] | Rc [%] | Rc [%] | Tc [%] | |
| 9-1 | $(Nb_2O_5)_{50}(Bi_2O_3)_{50}$ | 24 | 9.2 | 4.8 | 4.5 | 54 | ○ |
| 9-2 | | 10 | 9.2 | 4.8 | 4.5 | 54 | |
| 9-3 | | 5 | 9.2 | 4.8 | 4.5 | 54 | |
| 9-4 | | 2 | 9.2 | 4.8 | 4.5 | 54 | |
| 9-5 | | None | 9.2 | 4.8 | 4.5 | 54 | |
| 9-6 | $TiO_2$ | 24 | 9.9 | 4.2 | 4.5 | 50 | X |
| 9-7 | | 10 | 9.9 | 4.2 | 4.5 | 50 | |
| 9-8 | | 5 | 10.1 | 4.0 | 4.4 | 49 | |
| 9-9 | | 2 | 10.3 | 3.9 | 4.3 | 48 | |
| 9-10 | | None | 12.4 | 2.8 | 4.1 | 40 | |

In each information recording medium 2 including two information layers, the transmittance of the second information layer 13 was not able to be measured. Therefore, samples in each of which only the second information layer 13 and the protective layer 3 were formed on the substrate 1 as in Example 7 were produced, and the transmittance was checked.

All the values of the reflectance and the transmittance were those obtained when the recording layers were in a crystalline phase. The measurement was performed on the circumference of the information recording medium 2 at a radius of 40 mm from the center thereof. The performance stability was judged as "○" or "x", where "○" denotes that the performance of the information recording medium did not change and "x" denotes that it changed depending on the presence or absence of the substrate annealing step.

It was proved that when the transmittance adjusting layer 131 was $(Nb_2O_5)_{50}(TiO_2)_{50}$ (mol %), the recording sensitivity (Pp), the reflectance, and the transmittance did not change depending on the presence or absence of the substrate annealing step and thus the performance was stable (Samples 9-1 to 9-5). When the transmittance adjusting layer 131 was $TiO_2$, the performance was stable when the substrate annealing step was carried out at least ten hours (Samples 9-6 and 9-7). However, when the period of time for the substrate annealing step was shorter than ten hours, all the recording sensitivity (Pp), the reflectance Rc, and the transmittance Tc changed depending on the presence or absence of the substrate annealing step and the performance was not stable (Samples 9-7 to 9-10).

INDUSTRIAL APPLICABILITY

The information recording media of the present invention and the methods of manufacturing the same allow the transmittance adjusting layer to be deposited stably and efficiently and therefore are useful for efficiently obtaining multilayer information recording media with good recording/reproducing characteristics.

The invention claimed is:

1. An information recording medium, comprising N information layers provided on a substrate, where N is an integer of 2 or more, each of the information layers being irradiated with a laser beam and thereby information being recorded/reproduced with respect to each of the information layers,
wherein with the N information layers being referred to as a first information layer to an N-th information layer sequentially from an opposite side to a laser beam incident side, an L-th information layer included in the N information layers includes at least a recording layer capable of undergoing a phase change through irradiation with a laser beam, a reflective layer, and a transmittance adjusting layer in this order from the laser beam incident side, where L is an integer satisfying $2 \leq L \leq N$, and the transmittance adjusting layer contains Nb, oxygen (O), and at least one element M selected from Ti, Zr, Hf, Y, Cr, Zn, Ga, Co, Bi, In, Ta, and Ce, and the content of Nb in the transmittance adjusting layer is at least 2.9 atom % but not more than 26.5 atom %.

2. The information recording medium according to claim 1, wherein the transmittance adjusting layer contains at least 8.6 atom % of Nb.

3. The information recording medium according to claim 2, wherein the transmittance adjusting layer contains a material represented by the following formula:

$$Nb_x M_y O_{100-x-y} \text{ (atom \%)}$$

where x and y satisfy $x \geq 8.6$, $y \geq 0$, and $x+y \leq 37$.

4. The information recording medium according to claim 1, wherein the transmittance adjusting layer contains at least 10 mol % of oxide of Nb.

5. The information recording medium according to claim 4, wherein the transmittance adjusting layer contains at least 30 mol % of oxide of Nb.

6. The information recording medium according to claim 5, wherein the transmittance adjusting layer contains an oxide of Nb and an oxide of the element M, and contains a material represented by the following formula:

$$(Nb_2O_5)_z (M\text{-}O)_{100-z} \text{(mol \%)},$$

where M-O denotes an oxide of the element M, and z satisfies $z \geq 30$.

7. The information recording medium according to claim 1, wherein the transmittance adjusting layer contains at least 90 atom % of the element M, Nb, and oxygen (O) in total.

8. The information recording medium according to claim 1, wherein the transmittance adjusting layer contains at least 90 mol % of oxide of Nb and oxide of the element M in total.

9. The information recording medium according to claim 1, wherein the recording layer contains at least one material selected Ge—Sb—Te, Ge—Bi—Te, Ge—Sn—Te, Ge—Sb—Sn—Te, and Ge—Bi—Sn—Te, and the recording layer has a thickness in a range of 1 nm to 15 nm.

10. The information recording medium according to claim 1, wherein the thickness d of the transmittance adjusting layer satisfies $\lambda/32 n_r \leq d \leq \lambda/4 n_r$, where $\lambda$ is a wavelength of the laser beam and $n_r$ is a refractive index of the transmittance adjusting layer.

11. The information recording medium according to claim 10, wherein the thickness d of the transmittance adjusting layer satisfies $d=\lambda/8n_r$.

12. The information recording medium according to claim 10, wherein the thickness d of the transmittance adjusting layer is in a range of 5 nm to 36 nm.

13. The information recording medium according to claim 1, wherein the element M contained in the transmittance adjusting layer is at least one element selected from Ti, Zr, Hf, Y, Cr, Zn, Ga, Bi, In, and Ta.

14. The information recording medium according to claim 13, wherein the element M contained in the transmittance adjusting layer is at least one element selected from Ti, Zr, Hf, Zn, Ga, Bi, In, and Ta.

15. The information recording medium according to claim 14, wherein the element M contained in the transmittance adjusting layer is at least one element selected from Zn, Ga, Bi, In, and Ta.

16. The information recording medium according to claim 15, wherein the element M contained in the transmittance adjusting layer is at least one element selected from Bi and In.

17. The information recording medium according to claim 1, wherein the reflective layer contains at least one element selected from Ag, Au, Cu, and Al, and has a thickness in a range of 1 nm to 15 nm.

18. The information recording medium according to claim 1, further comprising a first dielectric layer disposed between the reflective layer and the recording layer.

19. The information recording medium according to claim 18, further comprising a first interface layer disposed between the first dielectric layer and the recording layer.

20. The information recording medium according to claim 1, further comprising a second dielectric layer disposed on the laser beam incident side with respect to the recording layer.

21. The information recording medium according to claim 20, further comprising a second interface layer disposed between the recording layer and the second dielectric layer.

22. The information recording medium according to claim 1, wherein N=2.

23. The information recording medium according to claim 1, wherein N=4.

24. A method of manufacturing an information recording medium according to claim 1, comprising a process for manufacturing the L-th information layer,
wherein the process comprises:
(i) a transmittance adjusting layer deposition process in which a transmittance adjusting layer is deposited using a first sputtering target that contains Nb, oxygen (O), and at least one element M selected from Ti, Zr, Hf, Y, Cr, Zn, Ga, Co, Bi, In, Ta, and Ce and the content of Nb is at least 2.9 atom % but not more than 26.5 atom %,
(ii) a reflective layer deposition process in which a reflective layer is deposited, and
(iii) a recording layer deposition process in which a recording layer capable of undergoing a phase change through irradiation with a laser beam is deposited, and the processes (i) to (iii) are carried out in the order of processes (i), (ii), and (iii) or processes (iii), (ii), and (i).

25. The method of manufacturing an information recording medium according to claim 24, wherein the method comprises:
(I) producing an N-th information layer to an m-th information layer on a first substrate in this order, where m is an integer satisfying $2 \leq m \leq N$,
(II) producing a first information layer to an (m−1)th information layer on a second substrate in this order, and
(III) bonding the m-th information layer and the (m−1)th information layer to each other,
when L satisfies $m \leq L \leq N$, the process (I) includes the processes (i) to (iii) for producing the L-th information layer in the order of processes (iii), (ii), and (i), and when L satisfies 2≦L≦m−1, the process (II) includes the processes (i) to (iii) for producing the L-th information layer in the order of processes (i), (ii), and (iii).

26. The method of manufacturing an information recording medium according to claim 24, wherein in the transmittance adjusting layer deposition process, no substrate annealing treatment is performed before the transmittance adjusting layer is deposited.

27. The method of manufacturing an information recording medium according to claim 24, wherein the first sputtering target contains at least 8.6 atom % of Nb.

28. The method of manufacturing an information recording medium according to claim 27, wherein the first sputtering target contains a material represented by the following formula:

$$Nb_xM_yO_{100-x-y} \text{ (atom \%)},$$

where x and y satisfy x≧8.6, y>0, and x+y≦37.

29. The method of manufacturing an information recording medium according to claim 24, wherein the first sputtering target contains at least 10 mol % of oxide of Nb.

30. The method of manufacturing an information recording medium according to claim 29, wherein the first sputtering target contains at least 30 mol % of oxide of Nb.

31. The method of manufacturing an information recording medium according to claim 30, wherein the first sputtering target contains an oxide of Nb and an oxide of the element M, and contains a material represented by the following formula:

$$(Nb_2O_5)_z(M\text{-}O)_{100-z} \text{ (mol \%)},$$

where M-O denotes an oxide of the element M, and z satisfies z≧30.

32. The method of manufacturing an information recording medium according to claim 24, wherein the first sputtering target contains at least 90 atom % of the element M, Nb, and oxygen (O) in total.

33. The method of manufacturing an information recording medium according to claim 24, wherein the first sputtering target contains at least 90 mol % of oxide of Nb and oxide of the element M in total.

34. The method of manufacturing an information recording medium according to claim 24, wherein in the recording layer deposition process, the recording layer is deposited using a second sputtering target containing at least one material selected from Ge—Sb—Te, Ge—Bi—Te, Ge—Sn—Te, Ge—Sb—Sn—Te, and Ge—Bi—Sn—Te in such a manner as to have a thickness in a range of 1 nm to 15 nm.

35. The method of manufacturing an information recording medium according to claim 24, wherein in the transmittance adjusting layer deposition process, the transmittance adjusting layer is deposited in such a manner as to have a thickness d that satisfies $\lambda/32n_t \leq d \leq \lambda/4n_t$, where λ denotes a wavelength of a laser beam used for recording and reproducing information, and $n_t$ indicates a refractive index of the first sputtering target at the wavelength λ.

36. The method of manufacturing an information recording medium according to claim 35, wherein in the transmittance adjusting layer deposition process, the transmittance adjusting layer is deposited in such a manner as to have a thickness d that satisfies $d=\lambda/8n_t$.

37. The method of manufacturing an information recording medium according to claim 35, wherein in the transmittance adjusting layer deposition process, the transmittance adjusting layer is deposited in such a manner as to have a thickness in a range of 5 nm to 36 nm.

38. The method of manufacturing an information recording medium according to claim 24, wherein in the reflective layer deposition process, the reflective layer is deposited using a third sputtering target containing at least one element selected from Ag, Au, Cu, and Al in such a manner as to have a thickness in a range of 1 nm to 15 nm.

39. The method of manufacturing an information recording medium according to claim 38, further comprising a first dielectric layer deposition process in which a first dielectric layer is deposited, between the reflective layer deposition process and the recording layer deposition process.

40. The method of manufacturing an information recording medium according to claim 39, further comprising a first interface layer deposition process in which a first interface layer is deposited, between the first dielectric layer deposition process and the recording layer deposition process.

41. The method of manufacturing an information recording medium according to claim 24, further comprising a second dielectric layer deposition process in which a second dielectric layer is deposited,
  wherein when the processes (i) to (iii) are carried out in the order of the processes (i), (ii), and (iii), the second dielectric layer deposition process is carried out later than the process (iii), and
  when the processes (i) to (iii) are carried out in the order of the processes (iii), (ii), and (i), the second dielectric layer deposition process is carried out earlier than the process (iii).

42. The method of manufacturing an information recording medium according to claim 41, further comprising a second interface layer deposition process in which a second interface layer is deposited, between the recording layer deposition process and the second dielectric layer deposition process.

43. The method of manufacturing an information recording medium according to claim 24, wherein N=2.

44. The method of manufacturing an information recording medium according to claim 24, wherein N=4.

* * * * *

UNITED STATES PATENT AND TRADEMARK OFFICE
CERTIFICATE OF CORRECTION

PATENT NO.      : 8,088,464 B2                              Page 1 of 1
APPLICATION NO. : 12/295083
DATED           : January 3, 2012
INVENTOR(S)     : Takaoka et al.

It is certified that error appears in the above-identified patent and that said Letters Patent is hereby corrected as shown below:

Column 35, line 30 (claim 3): $y \geq 0$, should be -- $y > 0$, --.

Column 35, line 54 (claim 9): after "selected" insert -- from --.

Signed and Sealed this
Seventh Day of August, 2012

David J. Kappos
*Director of the United States Patent and Trademark Office*